United States Patent
Watanabe et al.

(10) Patent No.: US 8,557,332 B2
(45) Date of Patent: Oct. 15, 2013

(54) PRODUCTION METHOD OF OPTICAL FILM, OPTICAL FILM AND IMAGE DISPLAY

(75) Inventors: Jun Watanabe, Minami-Ashigara (JP); Katsumi Inoue, Minami-Ashigara (JP); Takato Suzuki, Minami-Ashigara (JP); Tetsuya Asakura, Minami-Ashigara (JP); Hiroyuki Yoneyama, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1224 days.

(21) Appl. No.: 11/727,624

(22) Filed: Mar. 27, 2007

(65) Prior Publication Data

US 2007/0231478 A1 Oct. 4, 2007

(30) Foreign Application Priority Data

Mar. 28, 2006 (JP) ................. P2006-089030

(51) Int. Cl.
*B05D 5/06* (2006.01)
(52) U.S. Cl.
USPC .......................................... 427/162
(58) Field of Classification Search
USPC ................................ 427/160–169
See application file for complete search history.

(56) References Cited

U.S. PATENT DOCUMENTS 6,547,912 B2 * 4/2003 Enlow et al. ............. 156/244.23

FOREIGN PATENT DOCUMENTS

| JP | 2003-121606 A | | 4/2003 |
| JP | 2004-317734 | * | 11/2004 |
| JP | 2004-317734 A | | 11/2004 |
| JP | 2004-359930 A | | 12/2004 |

* cited by examiner

*Primary Examiner* — David Turocy
*Assistant Examiner* — Michael G Miller
(74) *Attorney, Agent, or Firm* — Buchanan Ingersoll & Rooney PC

(57) ABSTRACT

A method for producing an optical film is provided and includes: simultaneously coating at least two coating solutions over a transparent support, the at least two coating solutions each containing a solvent and a solute; and drying the solvent in each of the at least two coating solutions to provide at least two coating layers. When the at least two coating layers are 1, 2, . . . n−1 and n layers in sequence from the outermost surface of the at least two coating layers toward the transparent support, n being an integer of 2 or more, the main component of the solute in the n-th layer is insoluble or sparingly soluble in the main component of the solvent in the (n−1)-th layer.

12 Claims, 3 Drawing Sheets

PRODUCTION METHOD OF OPTICAL FILM, OPTICAL FILM AND IMAGE DISPLAY

BACKGROUND OF THE INVENTION

1. Field of the Invention

The present invention relates to a production method of an optical film, an optical film and an image display.

2. Description of Related Art

In various image displays such as liquid crystal display (LCD), plasma display panel (PDP), electroluminescent display (ELD), cathode ray tube display (CRT), field emission display (FED) and surface-conduction electron-emitter display (SED), an antireflection film is disposed on the display surface so as to prevent reduction in the contrast due to reflection of outside light or reflection of an image. Accordingly, the antireflection film is required to have high transmittance, high physical strength (e.g., scratch resistance), chemical resistance and weather resistance (e.g., humidity/heat resistance, light fastness) in addition to high antireflection performance.

For the formation of an antireflection layer (e.g., high refractive index layer, medium refractive index layer, low refractive index layer) used in the antireflection film, a method of coating a coating composition (wet coating) has been proposed.

In producing the antireflection film by a coating method, a single-layer or multilayer thin film needs to be formed by dissolving or dispersing a film-forming composition having a specific refractive index in a solvent, coating the prepared coating composition on a transparent support substrate, and drying and if desired, curing the coating. In the case of a single-layer film, a layer (low refractive index layer) having a refractive index lower than that of the substrate may be formed to a thickness of, in terms of the optical film thickness, ¼ the wavelength designed. When more reduction of reflectance is necessary, this may be attained by forming a layer (high refractive index layer) having a refractive index higher than that of the transparent support between the substrate and the layer having a low refractive index. In order to still more reduce the reflectance, an embodiment where a medium refractive index having a refractive index between the transparent support and the high refractive index layer is provided on the transparent substrate side of the high refractive index layer has been also proposed (see, JP-A-2003-121606).

In the case of forming a plurality of layers differing in the refractive index, the number of coating steps increases and this brings about a problem such as bad productivity and cost rise or a problem that when the adhesion between two layers is low, the scratch resistance is worsened. In order to solve these problems, a technique of simultaneously forming two different layers has been proposed (see, JP-A-2004-317734 and JP-A-2004-359930). For example, a production method of an antireflection film, where a coating solution containing both a fluorine-containing polymer and an inorganic fine particle is coated and cured one time, thereby simultaneously forming a high refractive index layer containing an inorganic fine particle and a low refractive index layer containing a fluorine-containing polymer, has been disclosed (see, JP-A-2004-317734). That is, two coating layers are formed by one-time single-layer coating. However, as regards the production method of an optical film, a technique capable of achieving low reflectance, neutral tint, high scratch resistance, high productivity, good surface state and the like has not yet been specifically proposed, and improvement of these properties is demanded.

SUMMARY OF THE INVENTION

One aspect of an illustrative, non-limiting embodiment of the invention is to provide a production method of an optical film, capable of simultaneously forming at least two coating layers on a transparent support and assured of low cost and high productivity.

Another aspect is to provide a production method of an optical film excellent in at least one property of low reflectance, unevenness-free uniform surface state, neutral tint and scratch resistance.

Still another aspect is to provide an image display having an optical film produced by the production method of the present invention and excellent in at least one property of low reflectance, unevenness-free uniform surface state, neutral tint and scratch resistance.

As described above, when two or more coating solutions are simultaneously coated, mixing between layers generally occurs and particularly, it is very difficult to control a thickness on the 100 nm order as in an optical interference layer and form a thin interface capable of effecting optical interference. With respect to the simultaneous multilayer coating, a technique of gelling each layer immediately after coating like a photographic light-sensitive material is known but even in this case, it is doubtful whether an interface capable of effecting optical interference can be formed. Furthermore, when an organic solvent is used, there is a severe restriction only on the conditions of the liquid composition to be gelled, and a function as the optical film cannot be virtually incorporated. As a result of intensive studies to solve these issues, the present inventors have found that the issues can be overcome and the above-described objects can be attained by the following constitutions. Aspects of the present invention have been accomplished based on this finding.

That is, aspects of the present invention is as follows.

(1) A method for producing an optical film, comprising:
simultaneously coating at least two coating solutions over a transparent support, the at least two coating solutions each containing a solvent and a solute; and
drying the solvent in each of the at least two coating solutions to provide at least two coating layers,
wherein when the at least two coating layers are 1, 2, . . . n−1 and n layers in sequence from the outermost surface of the at least two coating layers toward the transparent support, n being the number of the layers and an integer of 2 or more, the main component of the solute in the n-th layer is insoluble or sparingly soluble in the main component of the solvent in the (n−1)-th layer.

(2) The method as described in (1) above, wherein the main component of the solute in the (n−1)-th layer is easily soluble in the main component of the solvent in the n-th layer.

(3) A method for producing an optical film, comprising:
simultaneously coating at least two coating solutions over a transparent support, the at least two coating solutions each containing a solvent and a solute; and
drying the solvent in each of the at least two coating solutions to provide at least two coating layers,
wherein when the at least two coating solutions are mixed at the same volume ratio as that of amounts of the coating, the at least two coating solutions causes liquid-liquid phase separation into the respective layers.

(4) A method for producing an optical film, comprising:
simultaneously coating at least two coating solutions over a transparent support, the at least two coating solutions each containing a solvent and a solute; and drying the solvent in each of the at least two coating solutions to provide at least two coating layers,
wherein when the at least two coating solutions are mixed at the same volume ratio as that of amounts of the coating, the at least two coating solutions are immingled as a one-phase solution, and when the at least two coating solutions mixed are dried to decrease an amount of solvents therein by 10 wt %, the at least two coating solution causes liquid-liquid phase separation into the respective layers.

(5) The method as described in any one of (1) to (4) above, wherein a coating solution coated to provide an outermost surface layer of the optical film comprises a heat-curable or ionizing radiation-curable fluorine-containing compound.

(6) The method as described in (5) above, wherein the coating solution coated to provide the outermost surface layer further comprises a silicone compound.

(7) The method as described in (5) or (6) above, wherein the heat-curable or ionizing radiation-curable fluorine-containing compound has a silicone structural unit in a molecule thereof.

(8) The method as described in any one of (1) to (7) above, wherein a coating solution provide to a layer except for an outermost surface layer of the optical film comprises at least one of a bifunctional or greater functional polymerizable monomer and oligomer.

(9) The method as described in any one of (1) to (8) above, wherein a coating solution provide to a layer except for an outermost surface layer of the optical film comprises light-transparent particles having an average particle diameter of 1.0 μm or more.

(10) The method as described in any one of (1) to (9) above, wherein a coating solution provide to a layer except for an outermost surface layer of the optical film comprises inorganic oxide fine particles having an average particle diameter of 100 nm or less and a refractive index of 1.9 or more.

(11) The method as described in any one of (1) to (10) above, wherein the simultaneously coating of the at least two coating layers is performed by coating a lower layer on a web including the transparent support with a slot die of a composite coater, the composite coater comprising the slot die and a slide coating head disposed in an end part of the slot die, and coating at least one upper layer on the lower layer with the slide coating head, wherein the web continuously running while being supported by a backup roller.

(12) The method as described in any one of (1) to (11) above, further comprising curing the coating film by at least one of heat treatment and irradiation of ionizing radiation after the drying of the solvent.

(13) An optical film produced by a method described in any one of (1) to (12) above.

(14) An image display comprising an optical film described in (13) above.

Figure 1:
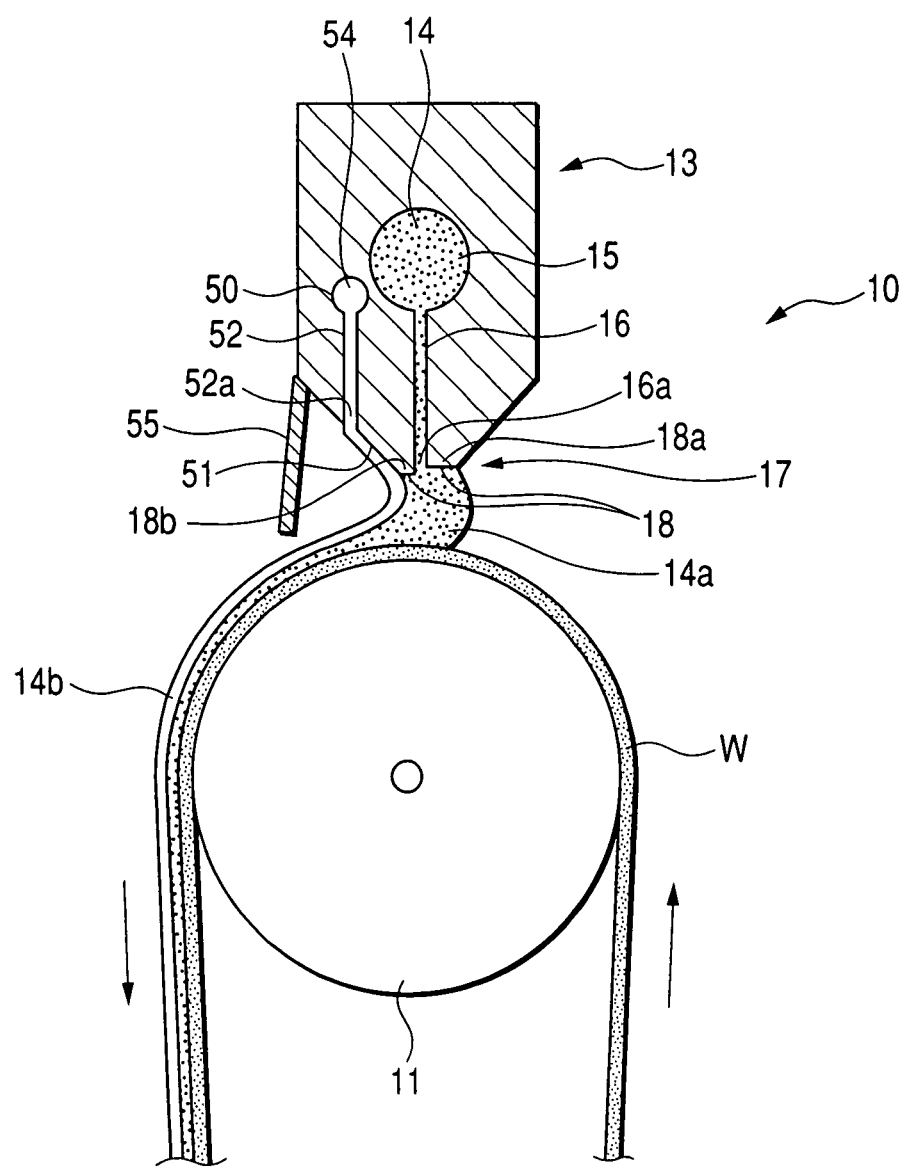
FIG. 1 is a cross-sectional view of a composite coater having a slot die and a slide in one layer, in which an exemplary embodiment of the present invention is practiced.

Reference numerals and symbols are identified as the followings:

| | |
|---|---|
| 10 | Coater |
| 11 | Backup roll |
| W | web |
| 13 | Slot die |
| 14, 54 | Coating solution |
| 14a | Bead |
| 14b | Coating film |
| 15, 50 | Pocket |
| 16, 52 | Slot |
| 16a, 52a | Slot opening |
| 17 | End lip |
| 18 | Land |
| 18a | Upstream lip land |
| 18b | Downstream lip land |
| $I_{UP}$ | Land length of upstream lip land 18a |
| $I_{LO}$ | Land length of downstream lip land 18b |
| LO | Overbite length (difference between the distance from the downstream lip land 18b to the web W and the distance from the upstream lip land 18a to the web) |
| $G_L$ | Gap between the end lip 17 and the web W (gap between the downstream lip land 18b and the web W) |
| 30 | General slot die |
| 31a | Upstream lip land |
| 31b | Downstream lip land |
| 32 | Pocket |
| 33 | Slot |
| 51 | Slide |
| 55 | Cover |

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment of the invention, at least two optical layers (for example, a low refractive index layer and a high refractive index layer) can be simultaneously formed by using coating solutions having specific physical properties and characteristics. That is, by simultaneously coating and forming at least two coating layers by a one-time coating step, an optical film having at least two optical layers can be produced. Therefore, a production method ensuring low cost and high productivity can be provided.

Also, in an exemplary embodiment of the present invention, when a low refractive index coating solution is used for the coating layer becoming the outermost surface layer out of at least two coating layers, an optical film (e.g., antireflection film, low-reflection film) excellent in at least one property of low reflectance, unevenness-free uniform surface state, neutral tint and scratch resistance can be obtained by a one-time step. Furthermore, under specific conditions, an unevenness-free uniform optical film having the same reflectance as that of a film produced by sequentially forming optical layers can be obtained by a one-time step.

In addition, the image display having an optical film produced by the production method has low reflectance and/or uniform surface state free of unevenness.

Exemplary embodiments of the present invention are described in detail below.

A first exemplary embodiment of the present invention is a production method of an optical film, comprising simultaneously coating at least two coating solutions over a transparent support, the at least two coating solutions each containing a solvent and a solute; and drying the solvent in each of the at least two coating solutions to provide at least two coating layers, wherein assuming that the at least two coating layers are 1, 2, . . . n−1 and n layers in sequence from the outermost surface toward the transparent support, n being an integer of 2 or more, the main component of the solute in the n-th layer is insoluble or sparingly soluble in the main component of the solvent in the (n−1)-th layer.

In the first embodiment, it is preferred that the main component of the solute in the (n−1)-th layer is easily soluble in the main component of the solvent in the n-th layer.

A second exemplary embodiment of the present invention is a production method of an optical film, comprising simultaneously coating at least two coating solutions over a transparent support, the at least two coating solutions each containing a solvent and a solute; and drying the solvent in each of the at least two coating solutions to provide at least two coating layers, wherein when the at least two coating solutions are mixed at the same volume ratio as that of amounts of the coating, the at least two coating solutions causes liquid-liquid phase separation into respective layers.

A third exemplary embodiment of the present invention is a production method of an optical film, comprising simultaneously coating at least two coating solutions over a transparent support, the at least two coating solutions each containing a solvent and a solute; and drying the solvent in each of the at least two coating solutions to provide at least two coating layers, wherein when the at least two coating solutions are mixed at the same volume ratio as that of amounts of the coating, the at least two coating solutions are immingled as a one-phase solution, and when the at least two coating solutions mixed are dried to decrease an amount of solvents therein by 10 wt %, the at least two coating solution causes liquid-liquid phase separation into the respective layers.

In a production method of the present invention, at least two coating solutions are simultaneously coated, dried and cured on a transparent support, whereby an optical film having at least two optical layers can be produced. The optical layers formed by the at least two coating layers are not particularly limited and include an optical layer such as antireflection layer, diffusing layer and antiglare layer. More specifically, examples thereof include a hardcoat layer, a low refractive index layer, a medium refractive index layer and a high refractive index layer.

For example, when one layer out of the at least two coating layers is formed by using a coating solution for hardcoat layer and at least other one layer is formed by using a coating solution selected from a coating solution for low refractive index layer, a coating solution for medium refractive index layer and a coating solution for high refractive index layer, an optical film (e.g., antireflection film, low-reflection film) excellent in at least one property of low reflectance, unevenness-free uniform surface state, neutral tint and scratch resistance can be obtained by a one-time step. In one aspect of the present invention, at least two coating layers are simultaneously coated and formed by a one-time coating step, whereby an optical film having at least two optical layers can be produced. Therefore, a production method ensuring low cost and high productivity can be provided. Also, a production method of the present invention is advantageous in that multiple optical layers can be simultaneously formed without sequentially forming the optical layers.

Furthermore, the image display having an optical film produced by a production method of the present invention has low reflectance and/or uniform surface state free of unevenness.

(Relationship Between Solvent and Solute of Each Layer)

In a production method of an optical film of the present invention, at the time of simultaneously coating and drying a plurality of coating solutions, the layers are independently formed without causing mutual mixing of solute components in respective layers and can be formed to a small thickness to an extent of allowing the interlayer interface to effect optical interference. Most simply, this may be achieved when the coating solutions or solute components of respective layers are in a relationship of not being intermingled, that is, blended. However, even when coating solutions incapable of being blended, for example, like a combination of an organic solvent-based solution and an aqueous solution, are merely coated, the objective layer structure cannot be always obtained. More specifically, adjacent layers simultaneously coated need to satisfy any one of the following relationships.

Incidentally, unless otherwise indicated, the term "solvent" as referred to in the specification means a compound (main component) occupying a maximum amount (weight unit) out of volatile components in the coating solution of each layer, and the term "solute" means a compound (main component) occupying a maximum amount (weight unit) out of nonvolatile components (solid contents) dissolved in the coating solution of each layer. At least these compounds need to satisfy the following relationship.

In the specification, a component not dissolved but dispersed in the coating solution, such as particle, is not treated as the solute.

As a first exemplary embodiment, a relationship that out of adjacent layers, the solute of the layer disposed on the support side (lower layer) is insoluble or sparingly soluble in the solvent of the layer disposed on the surface side (upper layer) is preferably established.

The term "insoluble" as used herein means a state that when about 1 mass % (weight %) of a solute is added to a solvent, an undissolved component remains, and the term "sparingly soluble" means a state that when about 10 mass % of a solute is added to a solvent, an undissolved component remains or even if there occurs no precipitation, the solution becomes apparently turbid. The observation of liquid was performed in the state of about 10 ml of the solution being filled in a 15 ml-volume transparent glass bottle under a white fluorescent lamp of 500 lux with black paper for the background.

After simultaneous coating, each component in both coating solutions diffuses and migrates but since the solute of the lower layer has bad compatibility with the solvent of the upper layer, the component of the lower layer is prevented from migrating into the upper layer, as a result, mixing of upper and lower layers can be suppressed.

At this time, as regards the relationship between the solute of the upper layer and the solvent of the lower layer, bad compatibility is preferred in view of separating the layers, but when such a relationship is established, the upper layer is not formed as a uniform layer but is formed like a sea island. This is considered to occur because the solvent of the lower layer when passing through the upper layer at the drying cannot be mixed with the solute of the upper layer and the solute of the upper layer aggregates to cause change in the interface shape from a layer structure to a spherical structure.

Furthermore, when a relationship that the solutes of respective layers both are insoluble in the solvent of the other party layer is established, respective solutes precipitate as a solid phase at the liquid interface and a uniform interface is not formed any more.

Therefore, as a preferred embodiment, a relationship that the solute of the upper layer is easily soluble in the solvent of the lower layer is preferably established. The term "easily soluble" means a state that even when about 20 mass % of a solute is added to a solvent, the solution is transparent.

As a third exemplary embodiment, the coating solutions are preferably formulated to swiftly cause liquid-liquid phase separation when respective components of the upper layer and lower layer are mixed, more specifically, the coating solutions are preferably prepared to have a relationship that when the coating solutions of the upper layer and lower layer are mixed at the same volume ratio as that of the coated amounts, liquid-liquid phase separation occurs. In this case, when diffusion of respective components after coating is started, phase separation immediately occurs in the vicinity of the coating interface and more diffusion is suppressed. Furthermore, a fine liquid droplet resulting from phase separation has a high possibility of coalescing with the original layer and a uniform liquid-liquid interface can be maintained.

Strictly speaking, each phase-separated phase (liquid droplet) becomes a phase where the solutes of the upper and lower layers are mixed at a certain distribution ratio. However, since further phase separation is repeated to give a distribution ratio of elevating the purity as the concentration is increased by the drying, a uniform optical interface causing substantially no problem can be formed.

The liquid-liquid phase separation can be confirmed, for example, by pouring a mixed solution in a transparent closed vessel, stirring and then allowing it to stand, and observing with an eye whether the solution is separated into two liquid phases. Even when a suspending solution appears immediately after stirring and whether liquid-liquid phase separation or precipitation is difficult to judge, after standing for 24 hours, the solution separates into two transparent liquid phases in the case of liquid-liquid phase separation.

As a fourth exemplary embodiment, the coating solutions are preferably prepared to have a relationship that the coating solutions of the upper layer and lower layer are immingled as a one-phase solution when mixed at the same volume ratio as that of the coated amounts but liquid-liquid phase separation occurs while the solution is concentrated to decrease the solvent amount by 10 wt %. Particularly, as in the case of a low refractive index layer and a hardcoat layer, when there is a difference in the coated amount between the upper layer and the lower layer or there is a difference in the amount between the upper layer solute and the lower layer solute, a coating composition satisfying the third relationship is difficult to find out. In such a case, good layers and interface can be formed also by satisfying the fourth relationship in which proceeding of drying to a certain extent is estimated. When this condition is satisfied, even if mixing occurs immediately after coating, liquid-liquid phase separation swiftly occurs at the subsequent drying and a substantially good interface can be formed.

The means for establishing the "relationship that out of adjacent layers, the solute of the layer disposed on the support side (lower layer) is insoluble or sparingly soluble in the solvent of the layer disposed on the surface side (upper layer)", which is the first embodiment, is described below.

The design of the solute of the lower layer varies depending on the solvent of the upper layer, but in the case where the solvent of the upper layer is a solvent having a high dielectric constant (17 or more), such as isopropyl alcohol or acetone, the solute of the lower layer preferably has a low polarity. In order to decrease the polarity, it is preferred to introduce an unsubstituted aliphatic or aromatic linking group. For example, a compound which is obtained by modifying dipentaerythritol with caprolactone and further modifying the terminal with an acrylate and which has an average molecular weight of 1,000 to 2,000, is preferred. Specific examples thereof include KAYARAD DPCA-60 and DPCA-120 (produced by Nippon Kayaku Co., Ltd.). Furthermore, out of the copolymers containing a repeating unit having an ethylenically unsaturated group and a repeating unit other than that as described in paragraphs 0027 and 0028 of JP-A-2002-322430, those having low porality are also preferably used.

On the other hand, in the case where the solvent of the upper layer has a low dielectric constant (less than 17), such as dialkyl ketone (e.g., MEK, MiBK) or alkyl-substituted aromatic hydrocarbon (e.g., toluene), the solute of the lower layer preferably has high polarity. In order to increase the polarity, it is preferred to use a compound containing a hydroxyl group within the molecule. For example, the polarity of the molecule can be controlled by changing the acetylation degree of a diacetyl cellulose having a molecular weight of about 3,000, and a polymer which is soluble in acetone and sparingly soluble in MEK can be produced with an acetylation degree of about 40%. Furthermore, out of copolymers containing a repeating unit having an ethylenically unsaturated group and a repeating unit other than that as described in paragraphs 0027 and 0028 of JP-A-2002-322430, those having a high-porality functional group, such as a copolymer where the copolymer component contains amides or a hydroxyl group, are also preferably used.

In addition to the polarity, the molecular weight of the solute is preferably increased so as to decrease the solubility. The molecular weight is preferably from 800 to 100,000, more preferably from 1,000 to 5,000. If the molecular weight is low, good solubility is exhibited for the solvent of the upper layer, whereas if the molecular weight is excessively large, the solvent in which the solute can be dissolved at the preparation of the coating solution for the layer is limited.

The means for "formulating the coating solutions to swiftly cause liquid-liquid phase separation when respective components of the upper layer and lower layer are mixed", which is the second embodiment in the present invention, is described below.

Effective means are to decrease the affinity between solutes of upper and lower layers, to control the molecular weight, and to use an inorganic fine particle in combination. In order to decrease the affinity between solutes, it is preferred to use a fluorine-containing compound or a silicon-containing compound for one solute. A compound containing a fluorine atom and a silicone within the same molecule is more preferred, and a polymer having a molecular weight of 8,000 or more is most preferred.

The polymer which can be preferably used in the present invention is described in detail later in the paragraph of the polymer for use in the low refractive index layer.

Also, control of the molecular weight of the solute is effective for the phase separation. When the solutes of both layers have a high molecular weight, the solubility decreases, but this involves increase of the viscosity and the re-separation after occurrence of forcible mixing due to turbulence at the interface of two layers upon coating tends to take time. Accordingly, a preferred region is present in the molecular weight relationship between the solutes of two layers, and the preferred regions are shown in Table 1 below.

TABLE 1

| Lower Layer | Upper Layer | | |
|---|---|---|---|
| | from 250 to less than 800 | from 800 to less than 8,000 | from 8,000 to less than 20,000 |
| from 250 to less than 800 | | ● | ◉ |
| from 800 to less than 8,000 | ● | ○ | ◉ |
| from 8,000 to less than 20,000 | ◉ | ◉ | ○ |

In the Table, ● indicates a preferred combination, ○ indicates a more preferred combination, and ◉ indicates a most preferred combination.

It is also effective for the acceleration of phase separation to use an oxide inorganic fine particle in at least one coating solution. The cause for the effective action of the oxide inorganic fine particle is not clearly known, but the oxide inorganic fine particle is presumed to behave like a polymer compound having on the surface thereof a plurality of high-polarity portions such as hydroxyl group and change the phase separation behavior. The inorganic fine particle may be subjected to a known surface treatment so as to control the surface polarity. The surface treatment of the inorganic particle may be performed using an organosilane compound having a polymerizable functional group described, for example, in WO2004/017105 and a catalyst. Also, for the purpose of hydrophobing the surface, the method described in JP-A-11-43319 may be preferably used. The inorganic fine particle used for this purpose preferably has a diameter of 1 to 150 nm, more preferably from 3 to 100 nm. Within this range, the fine particle itself can exhibit excellent dispersion stability and a coating film having high transparency can be formed.

(Optical Film Formation Method, Etc.)

In the present invention, the step of simultaneously applying coating solutions for two or more layers can be performed, for example, by a method selected from a curtain coating method, an extrusion coating method (die coating method) (see, U.S. Pat. No. 2,681,294), a slide coating method, and a combination thereof. In particular, a die coating method and a die/slide composite coating method, containing one or more die coating slots, are preferred, but the present invention is not limited thereto.

In order to supply the film of the present invention with high productivity, an extrusion method (die coating method) is preferably used. A slot die/slide composite coater preferably usable particularly in a region having a small wet coated amount (20 ml/m$^2$ or less), as in the hardcoat layer or antireflection layer, is described below.

(Constitution of Slot Die/Slide Composite Coater)

The embodiment of the present invention is described below by referring to the drawings. FIG. 1 is a slot die/slide composite coater which can be used for practicing the present invention. In the coater 10 of FIG. 1, a lower layer coating solution 14 formed into a bead 14a from a slot die 13 is coated on a continuously running transparent support-containing web (may be a web comprising only a transparent support or a web having other optical layers formed on a transparent support) W supported by a backup roll 11. In the vicinity of the end part of the slot die 13 (in FIG. 1, the top surface of the slot die 13), a slide-type coating head is provided and an upper layer coating solution 54 flows on the slide 51, whereby two layers including the lower layer are simultaneously coated on the web W and a coating film 14b is formed.

That is, while allowing a transparent support-containing web W to continuously run in the state of being supported by a backup roller 11, a lower layer is coated on the transparent support by using a slot die 13 and at the same time, an upper layer is coated on the lower layer by using a slide-type coating head disposed in the vicinity of the end part of the slot die. In FIG. 1, a composite coater capable of simultaneously forming two layers is used, but when a plurality of slide-type coating heads are provided, a plurality of coating layers can be formed by one-time coating.

Pockets 15 and 50 and slots 16 and 52 are formed inside the slot die 13. The cross section of the pockets 15 and 50 is constituted by a curve and a straight line and may have, for example, a nearly circular shape or a semicircular shape. The pockets 15 and 50 each is a liquid reservoir space for the coating solution and has a cross-sectional shape extended in the width direction of the slot die 13, and the length of its effective extension is generally set to be equal to or slightly longer than the coating width. The coating solution is supplied to the pocket 15 or 50 from the side surface of the slot die 13 or from the center of the surface opposite the slot opening 16a or 52a. Also, in the pockets 15 and 50, a stopper for preventing leakage of the coating solution is provided.

The slot 16 is a flow path of the coating solution 14 from the pocket 15 to the web W and, similarly to the pocket 15, has a cross-sectional shape extended in the width direction of the slot die 13, and the opening 16a positioned on the web side is generally adjusted to have nearly the same long width as the coating width by using a width regulating plate (not shown) or the like. The angle between the slot end of the slot 16 and the tangent line in the web running direction of a backup roller 11 is preferably from 30 to 90°.

The slot 52 is a flow path of the coating solution 54 from the pocket 50 to the slide 51 and, similarly to the pocket 15, has a cross-sectional shape extended in the width direction of the slot die 13, and the opening 52a positioned on the web side is generally adjusted to have nearly the same long width as the coating width by using a width regulating plate (not shown) or the like.

The end lip 17 of the slot die 13, where the opening 16a of the slot 16 is positioned, is tapered and the distal end thereof forms a flat part 18 called a land. In this land 18, the upstream side in the running direction of the web W with respect to the slot 16 is referred to as an upstream lip land 18a, and the downstream side is referred to as a downstream lip land 18b.

The slide 51 is present on the top surface of the slot die 13 and a coating solution flows thereon from the pocket 50. The slide 51 is generally adjusted to have nearly the same long width as the coating width by using an edge guide (not shown) or the like.

The length of the slide surface is preferably from 1.5 to 50 mm, more preferably from 1.5 to 20 mm, and most preferably from 2 to 10 mm. The length of the slide surface is preferably adjusted according to the viscosity of coating solution or the volatility of solvent used.

The coated amount flowed from the slide-type coating head is preferably 100 ml/m$^2$ or less, more preferably from 1 to 80 ml/m$^2$, still more preferably from 2 to 50 ml/m$^2$.

Particularly, when the coated amount is less than 4 ml/m$^2$, the liquid flow is liable to break on the slide surface and therefore, the coating solution is preferably allowed to flow at a flow rate of 5 ml/m$^2$ or more and then adjusted to a predetermined amount.

In order to prevent volatilization of the coating solution on the slide surface, a cover covering the entire slide surface is preferably provided. The cross-sectional area defined by the cover 55, the slide 51 and the backup roll W is preferably 550 mm$^2$ or less, more preferably 250 mm$^2$ or less, and most preferably 60 mm$^2$ or less.

Incidentally, the slide-type coating head is known and disclosed, for example, in JP-A-2003-164788.

Figure 2A:
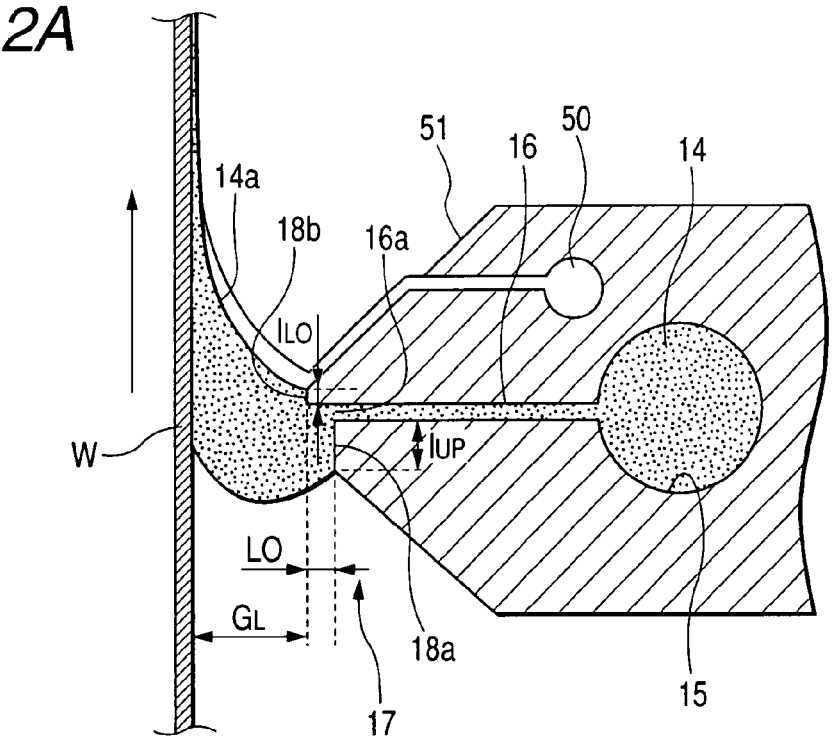
FIG. 2A is a view showing a cross-sectional shape of the slot die 13 and (B) is a view showing a cross-sectional shape of a general slot die 30.
Figure 2B:
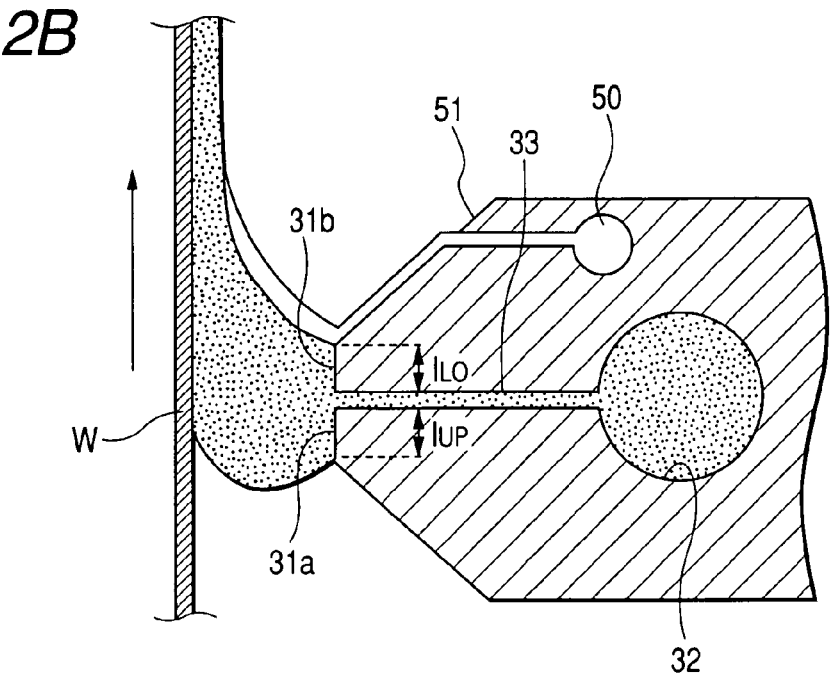

FIGS. 2A and 2B are views showing the cross-sectional shape of the slot die 13. The slot die of FIG. 2B is a general slot die and the distances from the web W to the upstream lip land 31a and to the downstream lip land 31b are equal. Incidentally, the numeral 32 denotes a pocket, and 33 denotes a slot. On the other hand, in the slot die of FIG. 2A, the length $I_{LO}$ of the downstream lip land is made shorter and by virtue of this constitution, coating for a wet film thickness of 20 μm or less can be performed with good precision. Of course, the slot die of FIG. 2A is preferably used in the present invention.

The land length $I_{UP}$ of the upstream lip land 18a in the running direction of the web W is not particularly limited but is preferably from 500 μm to 1 mm. The land length $I_{LO}$ of the downstream lip land 18b in the running direction of the web W is from 30 to 100 μm, preferably from 30 to 80 μm, more preferably from 30 to 60 μm. When the length $I_{LO}$ of the downstream lip land is 30 μm or more, chipping of the edge or land of the end lip and generation of streaks in the coating film can be prevented. Also, setting of the wet line position on the downstream side becomes easy and a problem that the coating solution is liable to spread on the downstream side does not occur. The wet spreading of the coating solution on the downstream side means that the wet line becomes non-uniform and as conventionally known, this gives rise to a problem of incurring a defective profile such as streak on the coated surface. On the other hand, when the length $I_{LO}$ of the downstream lip land is 100 μm or less, good bead formability and good thin-layer coating can be achieved.

The downstream lip land 18b is in an overbite form and approaches closer to the web W than the upstream lip land 18a, so that the degree of reduced pressure can be made small and a bead suitable for thin-film coating can be formed. The difference between the distance from the web W to the downstream lip land 18b and the distance to the upstream lip land 18a (hereinafter, this difference is referred to as an "overbite length LO") is preferably from 30 to 120 μm, more preferably from 30 to 100 μm, and most preferably from 30 to 80 μm. When the slot die 13 is in an overbite form, the gap $G_L$ between the end lip 17 and the web W indicates the gap between the downstream lip land 18b and the web W.

On the side opposite the web W travelling direction, a low-pressure chamber (not shown) may be provided at the position not coming into contact with the bead so that the pressure reduction for the bead 14a can be adjusted. By virtue of this constitution, the bead can be more stabilized and even when the distance between the web and the end lip is changed, for example, due to eccentricity of the backup roller, unevenness-free high-precision coating can be achieved.

The slot die and the slide head each may be provided in two or more layers, if desired. However, for forming a stable bead, the slot die is preferably provided at least in one layer.

In the present invention, for simultaneously coating two or more layers, the wet coated amount at the coating may be set according to the required film thickness of the layer after drying, but the ratio of the wet coated amount between the upper layer and the lower layer (upper layer/lower layer) is preferably from 1/0.5 to 1/100, more preferably from 1/1 to 1/50, and most preferably from 1/2 to 1/30. In addition to the above-described ratio of the flow rate, when the lower layer has a high viscosity, a high solid content concentration and a high surface tension in comparison with the upper layer, the coating film can have a good surface state and this is effective for preventing mixing at the interface of two layers.

(Construction Material and Precision)

As the length in the web running direction of the end lip on the side of the web travelling direction is longer, this is more disadvantageous to the bead formation. If this length fluctuates between arbitrary portions in the width direction of the slot die, the bead becomes unstable due to slight disturbance. Accordingly, the fluctuation margin of this length in the width direction of the slot die is preferably reduced to be within 20 μm.

As for the construction material for the end lip of the slot die, if a material such as stainless steel is used, the material is worn at the die working stage and even when the end lip of the slot die is made to have a length of 30 to 100 μm in the web running direction, the precision of the end lip cannot be satisfied. Therefore, for maintaining high working precision, it is important to use a super-hard material as described in Japanese Patent No. 2817053. Specifically, at least the end lip of the slot die is preferably formed of a cemented carbide obtained by binding carbide crystals having an average particle diameter of 5 μm or less. Examples of the cemented carbide include those obtained by binding carbide crystal particles such as tungsten carbide (hereinafter referred to as WC) with a binding metal such as cobalt. As for the binding metal, titanium, tantalum, niobium and a mixed metal thereof may also be used other than cobalt. The average particle diameter of WC crystal is more preferably 3 μm or less.

For realizing high-precision coating, the length of the land on the web travelling direction side of the end lip and the fluctuation of the gap with the web in the width direction of the slot die are also important factors. It is preferred to achieve a combination of these two factors, namely, a straightness in the range where the fluctuation margin of the gap can be suppressed to a certain extent. The straightness between the end lip and the backup roller is preferably established such that the fluctuation margin of the gap in the width direction of the slot die becomes 5 μm or less.

(Coating Speed)

In the coating system preferably used in the present invention, the film thickness at high-speed coating can be made highly stable by achieving the above-described precision of the backup roll and the end lip. Furthermore, this coating method is a pre-measurement system and therefore, a stable film thickness can be easily ensured even at high-speed coating. According to this coating method, a low-amount coating solution can be coated at a high speed with good film thickness stability. The coating may be performed by other coating methods, but in a dip coating method, the coating solution in a liquid-receiving tank is inevitably vibrated and stepwise unevenness is readily generated. In a reverse roll coating method, stepwise unevenness is liable to occur due to eccentricity or deflection of a roll involved in the coating. Also, these coating methods are a post-measurement system and therefore, a stable film thickness can be hardly ensured. In view of productivity, the coating is preferably performed using the above-described die coating method at a rate of 25 m/min or more. In addition, the coating speed is preferably increased for preventing the coating solutions from being mixed in the bead part at the coating, but since the coating speed has an upper limit for imparting stability of the bead, the following coating speed region is preferred. That is, the coating speed is preferably from 5 to 100 m/min, more preferably from 10 to 80 m/min, and most preferably from 20 to 60 m/min.

(Drying Step)

After the coating solution is coated on the support directly or through another layer, the film of the present invention is preferably transferred in the form of a web to a heated zone for drying the solvent.

As for the method of drying the solvent, various known techniques may be utilized. Specific examples thereof include those described in JP-A-2001-286817, JP-A-2001-314798, JP-A-2003-126768, JP-A-2003-315505 and JP-A-2004-34002.

The temperature in the drying zone is preferably from 25 to 140° C. and it is preferred that the temperature in the first half of the drying zone is relatively low and the temperature in the second half is relatively high. In the case where the evaporation rate of the solvent is the same, it is preferred that the temperature in the first half of the drying is relatively low, because the solute molecule or the coexisting fine particle or the like less diffuses and the mixing at the interface of layers provided by coating is thereby suppressed. Also, the temperature in the second half of the drying is preferably not more than a temperature at which the components other than the solvent contained in the coating composition for each layer start volatilizing. For example, some commercially available photoradical generators used in combination with an ultraviolet curable resin volatilize by about several tens of percent within several minutes in warm air at 120° C., and some monofunctional or bifunctional acrylate monomers or the like allow progress of their volatilization in warm air at 100° C. In such a case, as described above, the drying zone temperature is preferably not more than a temperature at which the components other than the solvent contained in the coating composition for each layer start volatilizing.

In order to prevent uneven drying, the drying air after applying the coating composition for each layer on the support is preferably blown at a speed of 0.1 to 2 m/sec on the coating film surface while the solid content concentration of the coating composition is from 1 to 50%.

Also, after applying the coating composition for each layer on the support, the difference of temperature in the drying zone between the support and a transfer roll in contact with the surface opposite the coated surface of the support is preferably set to be from 0 to 20° C., because uneven drying due to uneven heat transfer on the transfer roll can be prevented.

(Curing Step)

After drying the solvent, the coating film may be cured by passing the film of the present invention in the form of a web through a zone for curing each coating film by ionizing radiation and/or heat.

The species of the ionizing radiation for use in the present invention is not particularly limited and according to the kind of the curable composition for forming a film, the radiation may be appropriately selected from ultraviolet ray, electron beam, near ultraviolet ray, visible light, near infrared ray, infrared ray, X-ray and the like. Among these, ultraviolet ray and electron beam are preferred, and ultraviolet is more preferred because the handling is easy and a high energy can be easily obtained.

As for the light source of emitting ultraviolet ray which photopolymerizes an ultraviolet-reactive compound, any light source may be used as long as it emits ultraviolet ray. Examples of the light source which can be used include a low-pressure mercury lamp, a medium-pressure mercury lamp, a high-pressure mercury lamp, an ultrahigh-pressure mercury lamp, a carbon arc lamp, a metal halide lamp and a xenon lamp. Furthermore, an ArF excimer laser, a KrF excimer laser, an excimer lamp, a synchrotron radiation light and the like may also be used. Among these, an ultrahigh-pressure mercury lamp, a high-pressure mercury lamp, a low-pressure mercury lamp, a carbon arc, a xenon arc and a metal halide lamp can be preferably used.

An electron beam can also be similarly used. Examples of the electron beam include electron beams having an energy of 50 to 1,000 keV, preferably from 100 to 300 keV, emitted from various electron beam accelerators such as Cockroft-Walton type, Van de Graff type, resonance transformer type, insulating core transformer type, linear type, dynamitron type and high frequency type.

The irradiation conditions vary depending on individual lamps, but the irradiation light intensity is preferably 10 mJ/cm$^2$ or more, more preferably from 50 to 10,000 mJ/cm$^2$, still more preferably from 50 to 2,000 mJ/cm$^2$. At this time, the irradiation dose distribution in the width direction of the web is preferably, including both edges, from 50 to 100%, more preferably from 80 to 100%, based on the maximum irradiation dose in the center.

In the present invention, at least one layer stacked on the support is preferably cured by a step of irradiating ionizing radiation and at the same time, irradiating the ionizing radiation in an atmosphere having an oxygen concentration of 10 vol % or less for 0.5 seconds or more from the initiation of ionizing radiation irradiation in the state of the layer being heated at a film surface temperature of 60° C. or more.

It is also preferred that the layer is heated simultaneously with and/or successively to the irradiation of ionizing radiation, in an atmosphere having an oxygen concentration of 3 vol % or less.

In particular, the low refractive index layer which is an outermost layer and has a small film thickness is preferably cured by this method. The curing reaction is accelerated by the heat, and a film excellent in the physical strength and chemical resistance can be formed.

(Formation Method)

In the present invention, a plurality of coating solutions are preferably coated, dried and cured at the same time on a transparent support by one-time coating to form a plurality of optical layers such as hardcoat layer and antireflection layer. This method enables great reduction in the coating, drying and curing zones and is preferred in terms of productivity and cost. In the case of forming three or more layers, even if all layers cannot be simultaneously coated, when the production method of the present invention is used and two-layer simultaneous coating stations are continuously disposed, this is sufficiently advantageous in view of equipment and production. For example, in the case of forming four layers of hardcoat layer, medium refractive index layer, high refractive index layer and low refractive index layer on a transparent support, when the hardcoat layer and the medium refractive index layer are simultaneously formed and the surface two layers of high refractive index layer and low refractive index are then simultaneously formed, all that is required is to align two sets each consisting of coating station and drying-curing zone between the delivery of transparent support and the take-up and a great effect can be obtained.

(Constitution of Antireflection Film)

The optical film formed by the production method of the present invention is not particularly limited and examples thereof include an antireflection film, a light-diffusing film and an antiglare film, but the production method of the present invention is suitable in particular for the formation of an antireflection film.

A constitution example of the antireflection film is described below by referring to the drawings.

Figure 3:
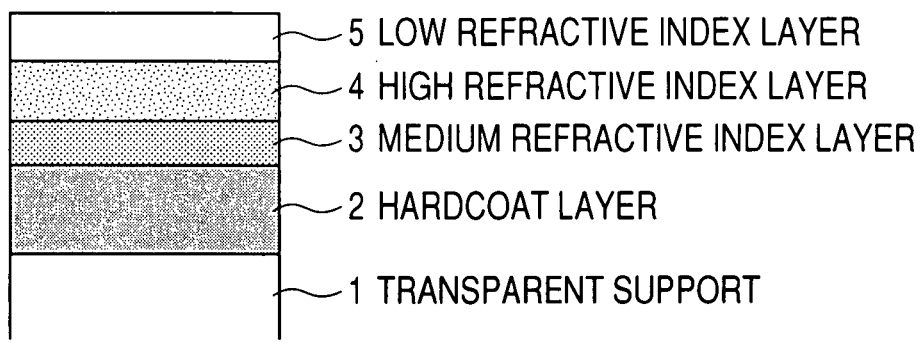
FIG. 3 is a cross-sectional view schematically showing an exemplary embodiment of an antireflection film of the present invention.

FIG. 3 is a cross-sectional view schematically showing a layer structure of a multilayer antireflection film having excellent antireflection performance. The antireflection film has a layer structure comprising a transparent support 1, a layer having hardcoat property (hereinafter, referred to as a hardcoat layer) 2, a medium refractive index layer 3, a high refractive index layer 4 and a low refractive index layer (outermost layer) 5 in this order. The transparent support 1, the medium refractive index layer 3, the high refractive index layer 4 and the low refractive index layer 5 preferably have refractive indexes satisfying the following relationship:

refractive index of high refractive index layer>refractive index of medium refractive index layer>refractive index of transparent support>refractive index of low refractive index layer.

In the layer structure shown in FIG. 3, as described in JP-A-59-50401, the medium refractive index layer, the high refractive index layer and the low refractive index layer preferably satisfy the following mathematical formulae (I), (II) and (III), respectively, because an antireflection film having more excellent antireflection performance can be produced.

$$(h\lambda/4)\times 0.7 < n3d3 < (h\lambda/4)\times 1.3 \quad \text{Mathematical Formula (I)}$$

In mathematical formula (I), h is a positive integer (generally 1, 2 or 3), n3 is a refractive index of the medium refractive index layer, d3 is a film thickness (nm) of the medium refractive index layer, and $\lambda$ is a wavelength (nm) of visible light and is a value in the range from 380 to 680 nm.

$$(i\lambda/4)\times 0.7 < n4d4 < (i\lambda/4)\times 1.3 \quad \text{Mathematical Formula (II)}$$

In mathematical formula (II), i is a positive integer (generally 1, 2 or 3), n4 is a refractive index of the high refractive index layer, d4 is a film thickness (nm) of the high refractive index layer, and $\lambda$ is a wavelength (nm) of visible light and is a value in the range from 380 to 680 nm.

$$(j\lambda/4)\times 0.7 < n5d5 < (j\lambda/4)\times 1.3 \quad \text{Mathematical Formula (III)}$$

In mathematical formula (III), j is a positive odd number (generally 1), n5 is a refractive index of the low refractive index layer, d5 is a film thickness (nm) of the low refractive index layer, and $\lambda$ is a wavelength (nm) of visible light and is a value in the range from 380 to 680 nm.

In the layer structure shown in FIG. 3, the medium refractive index layer, the high refractive index layer and the low refractive index layer more preferably satisfy the following mathematical formulae (IV), (V) and (VI), respectively. In formulae, $\lambda$ is 500 nm.

$$(\lambda/4)\times 0.80 < n3d3 < (\lambda/4)\times 1.00 \quad \text{Mathematical Formula (IV)}$$

$$(\lambda/2)\times 0.75 < n4d4 < (\lambda/2)\times 0.95 \quad \text{Mathematical Formula (V)}$$

$$(\lambda/4)\times 0.95 < n5d5 < (\lambda/4)\times 1.05 \quad \text{Mathematical Formula (VI)}$$

Figure 4:
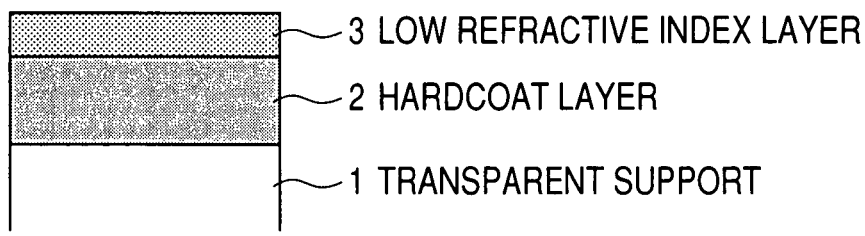
FIG. 4 is a cross-sectional view schematically showing another exemplary embodiment of an antireflection optical film of the present invention.

FIG. 4 is a cross-sectional view schematically showing another layer structure of a multilayer antireflection film having excellent antireflection performance. The antireflection film has a layer structure comprising a transparent support 1, a hardcoat layer 2 and a low refractive index layer (outermost layer) 3 in this order. The hardcoat layer may also be imparted with an antiglare function by providing fine irregularities on the surface thereof.

Figure 5:
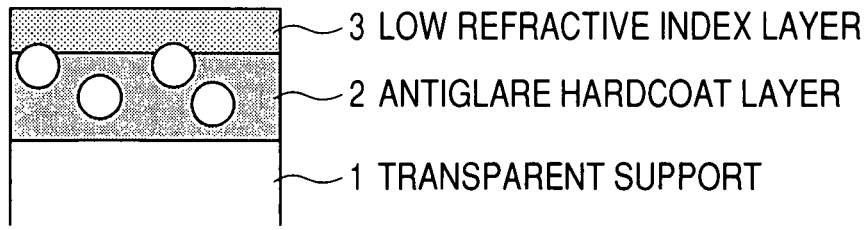
FIG. 5 is a cross-sectional view schematically showing still another exemplary embodiment of an antireflection optical film of the present invention.

FIG. 5 is a cross-sectional view schematically showing a layer structure of an antiglare antireflection film where as means of providing fine irregularities on the hardcoat layer surface, fine particles are used in the hardcoat layer. The antireflection film has a layer structure comprising a transparent support 1, an antiglare hardcoat layer 2 and a low refractive index layer (outermost layer) 3 in this order. The particle is preferably light-transparent.

The antireflection film of the present invention preferably has an integrated reflectance of 3% or less, more preferably 1.5% or less, still more preferably 0.5% or less. In the case of a gloss film without surface irregularities, the specular reflectance is nearly the same value as the integrated reflectance and its preferred range is also the same. In an antiglare film where irregularities are formed on the surface, the specular reflectance can be effectively reduced and can be adjusted to the above-described preferred range without incurring any trouble such as light browning phenomenon of real black.

In the case of obtaining a low reflectance, unless the refractive index and the film thickness are adjusted, a problem in view of quality may arise because layers differing in the refractive index are stacked. The color tint of the antireflection film of the present invention is preferably $|a^*|\leq 10$ and $|b^*|\leq 10$, more preferably $|a^*|\leq 7$ and $|b^*|\leq 7$, still more preferably $|a^*|\leq 5$ and $|b^*|\leq 5$, yet still more preferably $|a^*|\leq 4$ and $|b^*|\leq 4$.

(Transparent Support)

The support of the film of the present invention is not particularly limited and may be, for example, a transparent resin film, a transparent resin plate, a transparent resin sheet or a transparent glass. Examples of the transparent resin film which can be used include a cellulose acylate film (e.g., cellulose triacetate film (refractive index: 1.48), cellulose diacetate film, cellulose acetate butyrate film, cellulose acetate propionate film), a polyethylene terephthalate film, a polyethersulfone film, a polyacrylic resin film, a polyurethane-based resin film, a polyester film, a polycarbonate film, a polysulfone film, a polyether film, a polymethylpentene film, a polyether ketone film and a (meth)acrylonitrile film.

The thickness of the support is usually on the order of 25 to 1,000 μm, preferably from 25 to 200 μm, more preferably from 30 to 150 μm, still more preferably from 30 to 90 μm.

The support may have an arbitrary width but in view of handling, yield ratio and productivity, the width is usually from 100 to 5,000 mm, preferably from 800 to 3,000 mm, more preferably from 1,000 to 2,000 mm.

The support surface is preferably smooth, and the average roughness Ra value is preferably 1 μm or less, more preferably from 0.0001 to 0.5 μm, still more preferably from 0.001 to 0.1 μm.

The transparent support is preferably a plastic film. Examples of the plastic film include a cellulose ester (e.g., triacetyl cellulose, diacetyl cellulose, propionyl cellulose, butyryl cellulose, acetylpropionyl cellulose, nitrocellulose) and a polyolefin (e.g., polypropylene, polyethylene, polymethylpentene). Triacetyl cellulose and polyolefin are preferred for use in a polarizing plate because of small retardation and optical uniformity, and triacetyl cellulose is more preferred for use in a liquid crystal display.

(Resin Composition)

As for the component of each layer, a resin composition of reactive monomer, reactive oligomer or the like may be used in the present invention. The resin composition can be formed by a crosslinking or polymerization reaction of an ionizing radiation-curable compound. That is, the resin composition is a coating composition containing an ionizing radiation-curable monomer or oligomer and after coating the resin composition on a support, a crosslinking or polymerization reaction of the reactive monomer or oligomer is brought about, whereby the layer can be formed.

The functional group in the ionizing radiation-curable reactive monomer or oligomer is preferably a photo-, electron beam- or radiation-polymerizable functional group, more preferably a photopolymerizable functional group.

Examples of the photopolymerizable functional group include an unsaturated polymerizable functional group such as (meth)acryloyl group, vinyl group, styryl group and allyl group. Among these, a (meth)acryloyl group is preferred.

In particular, it is preferable to use the polymerizable monomer or oligomer for the formation of a layer except for the outermost layer. From the standpoint of enhancing the film strength or adhesion, the polymerizable monomer or oligomer used for the formation of a layer except for the outermost layer is preferably a polyfunctional monomer or polyfunctional oligomer having two or more functional groups within one molecule.

As for the reactive monomer contained in one layer, two or more species may be used in combination. In this case, at least one species is preferably a polyfunctional monomer.

Specific examples of the photopolymerizable polyfunctional monomer having a photopolymerizable functional group include:

(meth)acrylic acid diesters of alkylene glycol, such as neopentyl glycol acrylate, 1,6-hexanediol (meth)acrylate and propylene glycol di(meth)acrylate;

(meth)acrylic acid diesters of polyoxyalkylene glycol, such as triethylene glycol di(meth)acrylate, dipropylene glycol di(meth)acrylate, polyethylene glycol di(meth)acrylate and polypropylene glycol di(meth)acrylate;

(meth)acrylic acid diesters of polyhydric alcohol, such as pentaerythritol di(meth)acrylate; and (meth)acrylic acid diesters of ethylene oxide or propylene oxide adduct, such as 2,2-bis{4-(acryloxy•diethoxy)phenyl}propane and 2-2-bis{4-(acryloxy•polypropoxy)phenyl}propane.

Furthermore, epoxy (meth)acrylates, urethane (meth)acrylates and polyester (meth)acrylates may also be preferably used as the photopolymerizable polyfunctional monomer.

Among these, esters of a polyhydric alcohol with a (meth) acrylic acid are preferred, and a polyfunctional monomer having three or more (meth)acryloyl groups within one molecule is more preferred. Specific examples thereof include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)acrylate, (di)pentaerythritol hexa(meth)acrylate, tripentaerythritol triacrylate and tripentaerythritol hexatriacrylate. In the present invention, the terms "(meth)acrylate", "(meth)acrylic acid" and "(meth)acryloyl" indicate "acrylate or methacrylate", "acrylic acid or methacrylic acid" and "acryloyl or methacryloyl", respectively.

As for the monomer binder, monomers differing in the refractive index may be used for controlling the refractive index of each layer. In particular, examples of the high refractive index monomer include bis(4-methacryloylthiophenyl) sulfide, vinylnaphthalene, vinyl phenyl sulfide and 4-methacryloxyphenyl-4'-methoxyphenylthioether.

Furthermore, dendrimers described, for example, in JP-A-2005-76005 and JP-A-2005-36105, and norbornene ring-containing monomers described, for example, in JP-A-2005-60425 may also be used.

In the polymerization reaction of the photopolymerizable monomer, a photopolymerization initiator is preferably used. The photopolymerization initiator is preferably a photoradical polymerization initiator or a photo-cationic polymerization initiator, more preferably a photoradical polymerization initiator.

Examples of the photoradical polymerization initiator include acetophenones, benzophenones, Michler's benzoylbenzoate, α-amyloxime ester, tetramethylthiuram monosulfide and thioxanthones.

Examples of the commercially available photoradical polymerization initiator include KAYACURE (e.g., DETX-S, BP-100, BDMK, CTX, BMS, 2-EAQ, ABQ, CPTX, EPD, ITX, QTX, BTC, MCA) produced by Nippon Kayaku Co., Ltd.; IRGACURE (e.g., 651, 184, 500, 907, 369, 1173, 2959, 4265, 4263) produced by Nippon Ciba-Geigy Co.); and Esacure (e.g., KIP100F, KB1, EB3, BP, X33, KTO46, KT37, KIP150, TZT) produced by Sartomer Company Inc.

Particularly, a photocleavage-type photoradical polymerization initiator is preferred. The photocleavage-type photoradical polymerization initiator is described in *Saishin UV Koka Gijutsu* (*Latest UV Curing Technology*), page 159, Kazuhiro Takausu (publisher), Gijutsu Joho Kyokai (publishing company) (1991).

Examples of the commercially available photocleavage-type photoradical polymerization initiator include IRGACURE (651, 184, 907) produced by Nippon Ciba-Geigy Co.

The photopolymerization initiator is preferably used in an amount of 0.1 to 15 parts by mass, more preferably from 1 to 10 parts by mass, per 100 parts by mass of the monomer.

In addition to the photopolymerization initiator, a photosensitizer may be used. Specific examples of the photosensitizer include n-butylamine, triethylamine, tri-n-butylphosphine, Michler's ketone and thioxanthone.

Examples of the commercially available photosensitizer include KAYACURE (DMBI, EPA) produced by Nippon Kayaku Co., Ltd.

The photopolymerization reaction is preferably performed by irradiating an ultraviolet ray after coating and drying the coating layer.

(Coating Solvent)

As for the solvent used in the coating composition for forming each layer of the present invention, various solvents may be used and selected on the premise that the solvent can dissolve or disperse each component and satisfies the relationship of solubility or phase separation between adjacent solutes, and additionally from the standpoint that, for example, the solvent readily provides a uniform surface state in the coating step and drying step, ensures liquid storability or possesses an appropriate saturated vapor pressure.

Two or more kinds of solvents may be used as a mixture. In view of the drying load, it is preferred that a solvent having a boiling point of 100° C. or less at room temperature under atmospheric pressure is used as a main component and a small amount of a solvent having a boiling point of more than 100° C. is contained for adjusting the drying speed.

Examples of the solvent having a boiling point of 100° C. or less include hydrocarbons such as hexane (boiling point: 68.7° C.), heptane (98.4° C.), cyclohexane (80.7° C.) and benzene (80.1° C.); halogenated hydrocarbons such as dichloromethane (39.8° C.), chloroform (61.2° C.), carbon tetrachloride (76.8° C.), 1,2-dichloroethane (83.5° C.) and trichloroethylene (87.2° C.); ethers such as diethyl ether (34.6° C.), diisopropyl ether (68.5° C.), dipropyl ether (90.5° C.) and tetrahydrofuran (66° C.); esters such as ethyl formate (54.2° C.), methyl acetate (57.8° C.), ethyl acetate (77.1° C.) and isopropyl acetate (89° C.); ketones such as acetone (56.1° C.) and 2-butanone (same as methyl ethyl ketone, 79.6° C.); alcohols such as methanol (64.5° C.), ethanol (78.3° C.), 2-propanol (82.4° C.) and 1-propanol (97.2° C.); cyano compounds such as acetonitrile (81.6° C.) and propionitrile (97.4° C.); and carbon disulfide (46.2° C.). Among these, ketones and esters are preferred, and ketones are more preferred. Out of ketones, 2-butanone is preferred.

Examples of the solvent having a boiling point of more than 100° C. include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (same as MIBK, 115.9° C.), 1-butanol (117.7° C.), N,N-dimethylformamide (153° C.), N,N-dimethylacetamide (166° C.) and dimethyl sulfoxide (189° C.). Among these, cyclohexanone and 2-methyl-4-pentanone are preferred.

The layers constituting the optical film, particularly the antireflection film, of the present invention are described below.

(Hardcoat Layer)

In the film of the present invention, a hardcoat layer is preferably provided on one surface of the transparent support so as to impart physical strength to the film.

In the present invention, in view of optical design for obtaining an antireflection film, the refractive index of the hardcoat layer is preferably from 1.48 to 1.75, more preferably from 1.49 to 1.65, still more preferably from 1.50 to 1.55. In the present invention, in view of the reflectance, color tint and cost, the refractive index of the hardcoat layer is preferably neither more than this range nor less than this range.

From the standpoint of imparting satisfactory durability and impact resistance to the film, the thickness of the hardcoat layer is usually on the order of 0.5 to 50 μm, preferably from 1 to 30 μm, more preferably from 2 to 20 μm, and most preferably from 3 to 15 μm. A too thick hardcoat layer is not preferred in view of curling, productivity and cost.

The strength of the hardcoat layer is preferably H or more, more preferably 2H or more, still more preferably 3H or more, yet still more preferably 5H or more, in the pencil hardness test.

Furthermore, in the Taber test according to JIS K5400, the abrasion loss of the specimen between before and after test is preferably smaller.

The hardcoat layer is preferably formed through a crosslinking or polymerization reaction of an ionizing radiation-curable compound. For example, a coating composition containing the above-described ionizing radiation-curable monomer or oligomer is coated on a transparent support, and a crosslinking or polymerization reaction of the reactive monomer or reactive oligomer is brought about, whereby the hardcoat layer can be formed.

The functional group in the ionizing radiation-curable reactive monomer or reactive oligomer is preferably a photo-, electron beam- or radiation-polymerizable functional group, more preferably a photopolymerizable functional group.

Examples of the photopolymerizable functional group include an unsaturated polymerizable functional group such as (meth)acryloyl group, vinyl group, styryl group and allyl group. Among these, a (meth)acryloyl group is preferred.

For the purpose of imparting internal scattering property or antiglare property, the hardcoat layer may contain a light-transparent particle, for example, an inorganic compound particle or a resin particle, having an average particle diameter of 1.0 to 20.0 μm, preferably from 1.5 to 15.0 μm, more preferably from 1.5 to 10 μm. The content of the light-transparent particle is preferably from 0 to 66 wt %, more preferably from 1 to 50 wt %, still more preferably from 3 to 30%, based on the entire solid content of the hardcoat layer.

The average particle diameter of light-transparent particles can be measured and calculated by a Coulter counter method with an electron micrograph of the particles.

For the purpose of controlling the refractive index of the hardcoat layer, a high refractive index or low refractive index monomer or inorganic fine particle or both may be added to the binder of the hardcoat layer. The inorganic fine particle is not particularly limited, but an inorganic fine particle comprising, as a main component, one or more species of silicon dioxide, aluminum oxide, zirconia oxide, titanium oxide, zinc oxide, antimony oxide, tin oxide, indium oxide and the like can be preferably used. The average particle diameter of the inorganic fine particle is preferably 100 nm or less, more preferably from 1 to 80 nm, still more preferably from 2 to 50 nm, yet still more preferably from 5 to 30 nm. If the particle diameter is excessively large, the haze increases, whereas if the particle diameter is too small, there arises a problem that aggregation readily occurs or dispersion is difficult. The inorganic fine particle has an effect of suppressing curing shrinkage ascribable to the crosslinking reaction, in addition to the effect of controlling the refractive index. In the present invention, the "binder" is called as such, including a polymer produced by the polymerization of the above-described monomer and/or oligomer or the like after the formation of the hardcoat layer and in the case of containing an inorganic fine particle, also including the inorganic fine particle dispersed therein.

The average particle diameter of the inorganic fine particles can be measured by a Coulter counter method.

The haze of the hardcoat layer varies depending on the function imparted to the antireflection film.

In the case of imparting an antiglare function by the surface scattering of hardcoat layer in addition to the function of suppressing the surface reflectance, the surface haze (a value obtained by subtracting the internal haze value from the entire haze value; the internal haze value can be measured by eliminating irregularities on the film surface with a substance having the same refractive index as that of the film surface) is preferably from 0.3 to 20%, more preferably from 0.4 to 10%, still more preferably from 0.6 to 5%.

The antireflection film of the present invention can have high antireflection performance by suppressing the surface reflectance and therefore, in order to maintain the sharpness of image and suppress the white-blurring in bright room, it is also preferred in view of obtaining a good pictorial image quality not to impart an antiglare function by the hardcoat layer.

Also, in the case of imparting surface scattering by incorporating a light-transparent particle into the hardcoat layer, the preferred internal haze may vary depending on the purpose, but the internal haze value when imparting a function of making less perceivable the liquid crystal panel pattern, color unevenness, brightness unevenness or glaring by the effect of internal scattering or enlarging the viewing angle by the scattering is preferably from 10 to 90%, more preferably form 15 to 80%, still more preferably from 20 to 70%, and most preferably from 20 to 40%. On the other hand, in the case where the front contrast is important, the internal haze value is preferably from 0 to 30%, more preferably from 1 to 20%, and most preferably from 1 to 10%.

In the film of the present invention, the surface haze and internal haze may be freely set according to the purpose.

As for the surface irregularity shape of the hardcoat layer, the centerline average roughness (Ra) is preferably set to 0.30 μm or less. Ra is more preferably from 0.01 to 0.20 μm, still more preferably from 0.02 to 0.12 μm. If Ra is large, there arises a problem that white-blurring ascribable to surface scattering may occur or the layer formed on the hardcoat layer can hardly have uniformity. The average peak-to-trough distance (Sm) is preferably from 20 to 200 μm, more preferably from 40 to 160 μm, still more preferably from 50 to 130 μm. In the film of the present invention, the surface irregularities of the film are mainly governed by the surface irregularities of the hardcoat layer and therefore, the antireflection film can be made to have a centerline average roughness within the above-described range by adjusting the centerline average roughness of the hardcoat layer.

For the purpose of maintaining the sharpness of image, the transmitted image clarity is preferably adjusted in addition to the adjustment of surface irregularity shape. The transmitted image clarity of an antireflection film is preferably 60% or more. The transmitted image clarity is generally an index showing the degree of blurring of an image transmitted through and reflected on the film and as this value is larger, the image viewed through the film is clearer and better. The transmitted image clarity is preferably 70% or more, more preferably 80% or more.

(High Refractive Index Layer, Medium Refractive Index Layer)

In the film of the present invention, a high refractive index layer and a medium refractive index layer may be provided to enhance the antireflection property.

In the following, these high refractive index layer and medium refractive index layer are sometimes collectively referred to as a high refractive index layer. Incidentally, in the present invention, the terms "high", "medium" and "low" in the high refractive index layer, medium refractive index layer and low refractive index indicate the relative size of refractive index among layers. In terms of relationship with the transparent support, the refractive index preferably satisfies the relationships of transparent support>low refractive index layer, and high refractive index layer>transparent support.

Also, in the present invention, the high refractive layer, medium refractive layer and low refractive index layer are sometimes collectively referred to as an antireflection layer.

For producing an antireflection film by forming a low refractive index layer on a high refractive index layer, the refractive index of the high refractive index layer is preferably from 1.55 to 2.20, more preferably from 1.60 to 2.00, still more preferably from 1.65 to 1.90, and most preferably from 1.70 to 1.85. As the refractive index of the high refractive index layer is higher, the reflectance is more decreased, but color tint is intensified or due to increase in the amount of the inorganic fine particle in the high refractive index layer, there arises a problem that the layer becomes brittle or the haze becomes large. Therefore, in the present invention, the refractive index is preferably adjusted to the above-described range.

In the case of producing an antireflection film by providing a medium refractive index layer, a high refractive index layer and a low refractive index layer in this order from the support side, the refractive index of the medium refractive index layer is adjusted to become a value between the refractive index of the low refractive index layer and the refractive index of the high refractive index layer. The refractive index of the medium refractive index layer is preferably from 1.55 to 1.80, and the difference of the refractive index from the low refractive index layer and/or the high refractive index layer is preferably 0.08 or more, more preferably 0.10 or more.

For the purpose of controlling the refractive index of the hardcoat layer, a high refractive index inorganic fine particle is preferably added to the binder (for example, an ionizing radiation-curable monomer or oligomer and those described in item "Hardcoat layer") of the high refractive index layer and medium refractive index layer for use in the present invention. The high refractive index inorganic fine particle is not particularly limited, but an inorganic fine particle comprising, as a main component, one or more species of aluminum oxide, zirconia oxide, titanium oxide, zinc oxide, antimony oxide, tin oxide, indium oxide and the like can be preferably used. In particular, an inorganic fine particle comprising zirconium oxide (refractive index: about 2.2) or titanium oxide (refractive index: about 2.5) as a main component is preferred. The refractive index of the inorganic fine particle is preferably 1.9 or more, more preferably 2.0 or more. The average particle diameter of the inorganic fine particle is preferably 100 nm or less, more preferably from 1 to 80 nm, still more preferably from 2 to 50 nm, yet still more preferably from 5 to 30 nm. If the particle diameter is excessively large, the haze increases, whereas if the particle diameter is too small, there arises a problem that aggregation readily occurs or dispersion is difficult.

The inorganic fine particle for use in the high refractive index layer and medium refractive index layer is preferably used in a dispersion state for the formation of the high refractive index layer and medium refractive index layer. For the purpose of stabilizing the dispersion in a liquid dispersion or a coating solution or enhancing the affinity for or binding property with the binder component, the inorganic particle for use in the present invention may be subjected to a physical surface treatment such as plasma discharge treatment and corona discharge treatment, or a chemical surface treatment with a surfactant, a coupling agent or the like.

Simultaneously with or after the coating of the high or medium refractive index layer, the binder of the layer is preferably crosslinked or polymerized with a dispersant.

The binder of the thus-produced high or medium refractive index layer takes a form such that the anionic group of the dispersant is taken into the binder as a result of crosslinking or polymerization reaction between the above-described preferred dispersant and the ionizing radiation-curable monomer or oligomer. The anionic group taken into the binder of the high or medium refractive index layer exerts a function of maintaining the dispersed state of the inorganic fine particle, and the crosslinked or polymerized structure imparts a film-forming ability to the binder, whereby the high or medium refractive index layer containing the inorganic fine particle is improved in the physical strength, chemical resistance and weather resistance.

The binder of the high refractive index layer is added in an amount of 5 to 80 mass % based on the solid content of the coating composition for the layer.

The content of the inorganic particle in the high refractive index layer is preferably from 10 to 90 mass %, more preferably from 15 to 80 mass %, still more preferably from 30 to 75 mass %, based on the mass of the high refractive index layer. Two or more kinds of inorganic particles may be used in combination in the high refractive index layer.

In the high refractive index layer, a binder obtained by a crosslinking or polymerization reaction of an aromatic ring-containing ionizing radiation-curable compound, an ionizing radiation-curable compound containing a halogen element (e.g., Br, I, Cl) except for fluorine, an ionizing radiation-curable compound containing an atom such as S, N and P, or the like may also be preferably used.

The film thickness of the high refractive index layer may be appropriately designed according to the usage. In the case of using the high refractive index layer as an optical interference layer described later, the film thickness is preferably from 30 to 200 nm, more preferably from 50 to 170 nm, still more preferably from 60 to 150 nm.

The haze of the high refractive index layer is preferably lower. The haze is preferably 5% or less, more preferably 3% or less, still more preferably 1% or less.

The high refractive index layer is preferably formed on the transparent layer directly or through another layer.

(Low Refractive Index Layer)

For reducing the reflectance, a low refractive index layer needs to be used for the outermost surface layer of the antireflection film of the present invention.

The refractive index of the low refractive index layer is preferably from 1.20 to 1.46, more preferably from 1.25 to 1.46, still more preferably from 1.30 to 1.46.

The thickness of the low refractive index layer is preferably from 50 to 200 nm, more preferably from 70 to 100 nm. The haze of the low refractive index layer is preferably 3% or less, more preferably 2% or less, and most preferably 1% or less. The strength after the formation of the low refractive index layer is preferably H or more, more preferably 2H or more, still more preferably 3H or more, yet still more preferably 5H or more, in the pencil hardness test with a load of 500 g.

In order to improve the antifouling performance of the optical film, the contact angle with water of the surface is preferably 90° or more, more preferably 95° or more, still more preferably 100° or more. The coefficient of dynamic friction on the low refractive index layer is preferably from 0.03 to 0.30.

As for the resin component for the low refractive index layer, the curable composition may use any of heat-curable or ionizing radiation-curable monomer, oligomer and polymer, but (A) a heat-curable or ionizing radiation-curable fluorine-containing compound (e.g., fluorine-containing polymer, fluorine-containing sol-gel material) is preferably used. The curable composition preferably also contains (B) an inorganic particle and/or (C) an organosilane compound, and more preferably all of these three components (A) to (C).

As for the fluorine-containing compound, in view of antifouling property and durability, those having a silicone structural unit in the molecule are preferred.

The fluorine-containing compound is preferably contained as a film-forming component of the layer in the coating solution for low refractive index layer in an amount of 30 to 90 mass %, more preferably from 30 to 70 mass %.

In the present invention, in view of chemical resistance and productivity, a fluorine-containing polymer is preferably used as the binder for the low refractive index layer. The fluorine-containing polymer may be either heat-curable or ionizing radiation-curable. In the present invention, the high refractive index layer and the low refractive index layer are preferably formed at the same time. In order to enhance the affinity for or bonding property with the high refractive index layer component and elevate the scratch resistance of the antireflection film, the fluorine-containing polymer is preferably ionizing radiation-curable type. In the case of using a heat-curable type, a binder component having both a heat-curable crosslinking group and an ionizing radiation-curable crosslinking group is preferably used at the same time.

Preferred embodiments of the fluorine-containing compound having a crosslinking or polymerizable functional group are described below.

The fluorine-containing compound having a crosslinking or polymerizable functional group includes a copolymer of a fluorine-containing monomer and a monomer having a crosslinking or polymerizable functional group. Examples of the fluorine-containing monomer include fluoroolefins (e.g., fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid (e.g., BISCOAT 6FM (produced by Osaka Organic Chemical Industry, Ltd.), M-2020 (produced by Daikin Industries, Ltd.)), and completely or partially fluorinated vinyl ethers.

The monomer for imparting a crosslinking group includes, in one embodiment, a (meth)acrylate monomer previously having a crosslinking functional group within the molecule, such as glycidyl methacrylate. Another embodiment is a method of using a monomer having a functional group such as hydroxyl group to synthesize a fluorine-containing copolymer and then further using a monomer to modify the substituent and thereby introduce a crosslinking or polymerizable functional group. Such a monomer includes a (meth)acrylate monomer (e.g., (meth)acrylic acid, methylol (meth)acrylate, hydroxyalkyl (meth)acrylate, allyl acrylate) having a carboxyl, hydroxyl, amino or sulfo group or the like. The latter embodiment is disclosed in JP-A-10-25388 and JP-A-10-147739.

In view of solubility, dispersibility, coatability, antifouling property and antistatic property, the fluorine-containing copolymer may contain an appropriate copolymerizable component. In particular, for imparting antifouling property and slipperiness, silicone is preferably introduced, and this may be introduced into either the main chain or the side chain.

Examples of the method for introducing a polysiloxane partial structure into the main chain include a method using a polymer-type initiator such as azo group-containing polysiloxane amide (for example, as the commercial product, VPS-0501 or 1001 (trade names), produced by Wako Pure Chemical Industries, Ltd.) described in JP-A-6-93100. With respect to the method for introducing the partial structure into the side chain, the synthesis may be performed by a method of introducing a polysiloxane having a reactive group at one terminal (for example, SILAPLANE Series (produced by Chisso Corp.)) through a polymer reaction as described, for example, in *J. Appl. Polym. Sci.*, 2000, 78 (1955) and JP-A-56-28219, or by a method of polymerizing a polysiloxane-containing silicon macromer. Either method may be preferably used.

In the above-described polymer, a curing agent having a polymerizable unsaturated group may be appropriately used in combination as described in JP-A-2000-17028. Also, use in combination with a fluorine-containing compound having a polyfunctional polymerizable unsaturated group as described in JP-A-2002-145952 is preferred. Examples of the compound having a polyfunctional polymerizable unsaturated group include the above-described monomer having two or more ethylenically unsaturated groups. Furthermore, a hydrolysis condensate of an organosilane described in JP-A-2004-170901 is also preferred, and a hydrolysis condensate of an organosilane having a (meth)acryloyl group is more preferred.

When such a compound, particularly, a compound having a polymerizable unsaturated group in the polymer body is used, a large effect is provided on the improvement of scratch resistance by the combination use and this is preferred.

In the case where the polymer per se does not have satisfactory curability by itself, necessary curability can be imparted by blending a crosslinking compound. For example, when the polymer body contains a hydroxyl group, various amino compounds are preferably used as the curing agent. The amino compound used as the crosslinking compound is, for example, a compound having two or more in total of either one or both of a hydroxyalkylamino group and an alkoxyalkylamino group. Specific examples thereof include a melamine-based compound, a urea-based compound, a benzoguanamine-based compound and a glycoluril-based compound. Such a compound is preferably cured using an organic acid or a salt thereof.

Specific examples of the fluorine-containing polymer include those described in JP-A-2003-222702 and JP-A-2003-183322.

(Antifouling Agent)

In the film of the present invention, particularly, in the uppermost layer of the film, an appropriate known silicon-based or fluorine-based antifouling agent, slipping agent or the like is preferably added for the purpose of imparting properties such as antifouling property, water resistance, chemical resistance and slipperiness.

In the case of adding such an additive, the additive is preferably added in an amount of 0.01 to 20 mass %, more preferably from 0.05 to 10 mass %, still more preferably from 0.1 to 7 mass %, based on the entire solid content of the low refractive index layer.

Preferred examples of the silicone-based compound include those containing a plurality of dimethylsilyloxy repeating units and having a substituent at the chain terminal and/or in the side chain. In the chain of the compound containing dimethylsilyloxy repeating units, a structural unit other than dimethylsilyloxy may be contained. A plurality of substituents, which may be the same or different, are preferably present. Preferred examples of the substituent include a group containing an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group or an amino group. The molecular weight is not particularly limited but is preferably 100,000 or less, more preferably 50,000 or less, still more preferably from 3,000 to 30,000, and most preferably from 10,000 to 20,000. The silicone atom content of the silicone-based compound is not particularly limited but is preferably 18.0 mass % or more, more preferably from 25.0 to 37.8 mass %, and most preferably from 30.0 to 37.0 mass %. Preferred examples of the silicone-based compound include, but are not limited to, X-22-174DX, X-22-2426, X-22-164B, X-22-164C, X-22-170DX, X-22-176D and X-22-1821 (all trade names) produced by Shin-Etsu Chemical Co., Ltd.; FM-0725, FM-7725, FM-4421, FM-5521, FM6621 and FM-1121 produced by Chisso Corporation; and DMS-U22, RMS-033, RMS-083, UMS-182, DMS-H21, DMS-H31, HMS-301, FMS121, FMS123, FMS131, FMS141 and FMS221 (all trade names) produced by Gelest.

The fluorine-based compound is preferably a compound having a fluoroalkyl group. The fluoroalkyl group preferably has a carbon number of 1 to 20, more preferably from 1 to 10, and may be linear (e.g., $-CF_2CF_3$, $-CH_2(CF_2)_4H$, $-CH_2(CF_2)_8CF_3$, $-CH_2CH_2(CF_2)_4H$), may have a branched structure (e.g., $CH(CF_3)_2$, $CH_2CF(CF_3)_2$, $CH(CH_3)CF_2CF_3$, $CH(CH_3)(CF_2)_5CF_2H$) or an alicyclic structure (preferably a 5- or 6-membered ring, for example, a perfluorocyclohexyl group, a perfluorocyclopentyl group or an alkyl group substituted by such a group) or may have an ether bond (e.g., $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$). A plurality of the fluoroalkyl groups may be contained within the same molecule.

The fluorine-based compound preferably further has a substituent which contributes to the bond formation or compatibility with the low refractive index layer film. A plurality of substituents, which may be the same or different, are preferably present. Preferred examples of the substituent include an acryloyl group, a methacryloyl group, a vinyl group, an aryl group, a cinnamoyl group, an epoxy group, an oxetanyl group, a hydroxyl group, a polyoxyalkylene group, a carboxyl group and an amino group. The fluorine-based compound may be a polymer or oligomer with a compound containing no fluorine atom, and the molecular weight is not particularly limited. The fluorine atom content of the fluorine-based compound is not particularly limited but is preferably 20 mass % or more, more preferably from 30 to 70 mass %, and most preferably from 40 to 70 mass %. Preferred examples of the fluorine-based compound include, but are not limited to, R-2020, M-2020, R-3833 and M-3833 (all trade names) produced by Daikin Kogyo Co., Ltd.; and Megafac F-171, F-172, F-179A and DYFENSA MCF-300 (all trade names) produced by Dai-Nippon Ink & Chemicals, Inc.

For the purpose of imparting properties such as dust protection and antistatic property, a known dust inhibitor, antistatic agent or the like, such as cationic surfactant or polyoxyalkylene-based compound, may be appropriately added. A structural unit of such a dust inhibitor or antistatic agent may be contained as a part of the function in the above-described silicone-based compound or fluorine-based compound. In the case of adding such an additive, the additive is preferably added in an amount of 0.01 to 20 mass %, more preferably from 0.05 to 10 mass %, still more preferably from 0.1 to 5 mass %, based on the entire solid content of the low refractive index layer. Preferred examples of the compound include, but are not limited to, Megafac F-150 (trade name) produced by Dai-Nippon Ink & Chemicals, Inc.; and SH-3748 (trade name) produced by Toray Dow Corning.

(Low Refractive Index Particle)

The inorganic particle incorporated into the low refractive index layer preferably has a low refractive index, and examples thereof include fine particles of magnesium fluoride and silica. Among these, a silica fine particle is preferred in view of refractive index, dispersion stability and cost.

The average particle diameter of the silica fine particle is preferably from 10 to 150%, more preferably from 15 to 80%, still more preferably from 40 to 60%, of the thickness of the low refractive index layer. In other words, when the thickness of the low refractive index layer is 100 nm, the particle diameter of the silica fine particle is preferably from 10 to 150 nm, more preferably from 15 to 80 nm, still more preferably from 40 to 60 nm.

The average particle diameter of the inorganic particle is measured by a Coulter counter.

If the particle diameter of the silica fine particle is too small, the effect of improving the scratch resistance decreases, whereas if it is excessively large, fine irregularities are generated on the low refractive index layer surface and the appearance (e.g., real black) or integrated reflectance may be deteriorated. The silica fine particle may be either crystalline or amorphous and may be a monodisperse particle or may be even an aggregated particle as long as the predetermined particle diameter is satisfied. The shape is most preferably spherical but even if infinite form, there arises no problem.

At least one kind of a silica fine particle having an average particle size of less than 25% of the thickness of the low refractive index layer (this fine particle is referred to as a "small particle-diameter silica fine particle") is preferably used in combination with the silica fine particle having the above-described particle diameter (this fine particle is referred to as a "large particle-diameter silica fine particle").

The small particle-diameter silica fine particle can be present in a gap between large particle-diameter silica fine particles and therefore, can contribute as a holding agent for the large particle-diameter silica fine particle.

The average particle diameter of the small particle-diameter silica fine particle, when the thickness of the low refractive index layer is 100 nm, is preferably from 1 to 20 nm, more preferably from 5 to 15 nm, still more preferably from 10 to 15 nm. Use of such a silica fine particle is preferred in view of the raw material cost and the holding agent effect.

The amount of the low refractive index particle coated is preferably from 1 to 100 mg/m$^2$, more preferably from 5 to 80 mg/m$^2$, still more preferably from 10 to 60 mg/m$^2$. If the amount coated is too small, the effect of improving the scratch resistance decreases, whereas if it is excessively large, fine irregularities are generated on the low refractive index layer surface and the appearance (e.g., real black) or integrated reflectance may be deteriorated.

(Hollow Silica Particle)

For the purpose of more decreasing the refractive index, a hollow silica fine particle is preferably used.

The refractive index of the hollow silica fine particle is preferably from 1.15 to 1.40, more preferably from 1.17 to 1.35, and most preferably from 1.17 to 1.30. The refractive index used here indicates a refractive index of the particle as a whole and does not indicate a refractive index of only silica as an outer shell forming the hollow silica particle. At this time, assuming that the radius of the cavity inside the particle is a and the radius of the outer shell of the particle is b, the porosity x calculated according the following mathematical formula (VIII) is preferably from 10 to 60%, more preferably from 20 to 60%, and most preferably from 30 to 60%.

$$x=(4\pi a^3/3)/(4\pi b^3/3)\times 100 \qquad \text{Mathematical formula (VIII)}$$

If the hollow silica particle is intended to have a lower refractive index and a higher porosity, the thickness of the outer shell becomes small and the strength as a particle decreases. Therefore, in view of scratch resistance, a particle having a refractive index of less than 1.15 is not preferred.

The production method of the hollow silica is described, for example, in JP-A-2001-233611 and JP-A-2002-79616. In particular, a particle where a cavity is present inside the shell and pores of the shell are closed is preferred. Incidentally, the refractive index of such a hollow silica particle can be calculated by the method described in JP-A-2002-79616.

The amount of the hollow silica coated is preferably from 1 to 100 mg/m$^2$, more preferably from 5 to 80 mg/m$^2$, still more preferably from 10 to 60 mg/m$^2$. If the amount coated is too small, the effect of decreasing the refractive index or improving the scratch resistance decreases, whereas if it is excessively large, fine irregularities are generated on the low refractive index layer surface and the appearance (e.g., real black) or integrated reflectance is deteriorated.

The average particle diameter of the hollow silica is preferably from 30 to 150%, more preferably from 35 to 80%, still more preferably from 40 to 60%, of the thickness of the low refractive index layer. In other words, when the thickness of the low refractive index layer is 100 nm, the particle diameter of the hollow silica is preferably from 30 to 150 nm, more preferably from 35 to 100 nm, still more preferably from 40 to 65 nm.

If the particle diameter of the silica fine particle is too small, the proportion of the cavity part decreases and reduction of the refractive index cannot be expected, whereas if it is excessively large, fine irregularities are generated on the low refractive index layer surface and the appearance (e.g., real black) or integrated reflectance may be deteriorated. The silica fine particle may be crystalline or amorphous and is preferably a monodisperse particle. The shape is most preferably spherical but even if infinite form, there arises no problem.

Two or more kinds of hollow silica particles differing in the average particle size may be used in combination. The average particle diameter of the hollow silica can be determined from an electron microphotograph.

In the present invention, the specific surface area of the hollow silica is preferably from 20 to 300 m$^2$/g, more preferably from 30 to 120 m$^2$/g, and most preferably from 40 to 90 m$^2$/g. The surface area can be determined by the BET method using nitrogen.

In the present invention, a cavity-free silica particle may be used in combination with the hollow silica. The particle size of the cavity-free silica is preferably from 30 to 150 nm, more preferably from 35 to 100 nm, and most preferably from 40 to 80 nm.

(Protective Film for Polarizing Plate)

In the case of using the antireflection film of the present invention for a liquid crystal display, the antireflection film is used as a surface protective film of a polarizing film at the preparation of a polarizing plate (protective film for polarizing plate) and therefore, the adhesive property to the polarizing film comprising polyvinyl alcohol as a main component must be improved by rendering hydrophilic the transparent support surface on the side opposite the side having a low refractive index layer, that is, the surface on the side to be laminated with the polarizing film.

The transparent support is preferably a triacetyl cellulose film.

As regards the means for producing the protective film for polarizing plate in the present invention, two means may be considered, that is, (1) means of coating and providing each of the above-described layers (e.g., hardcoat layer, medium refractive index layer, surface two layers) on one surface of a previously saponified transparent support, and (2) means of coating and providing respective layers described above on one surface of a transparent support and saponifying the surface on the side to be laminated with the polarizing film. In (1), the surface to be coated with a hardcoat is also hydrophilized and the adhesion between the support and the hardcoat layer can be hardly ensured. Therefore, the means of (2) is preferred.

(Saponification Treatment)

(1) Dipping Method

This is a technique of dipping the antireflection film in an alkali solution under appropriate conditions to saponify all the surface having reactivity with an alkali on the entire surface of the film. This method requires no special equipment and is preferred in view of cost. The alkali solution is preferably an aqueous sodium hydroxide solution. The concentration is preferably from 0.5 to 3 mol/liter, more preferably from 1 to 2 mol/liter. The liquid temperature of the alkali solution is preferably from 30 to 70° C., more preferably from 40 to 60° C.

The combination of the saponification conditions is preferably a combination of relatively mild conditions but may be selected according to the material or constitution of the antireflection film or the objective contact angle.

The film after dipping in an alkali solution is preferably well washed with water or dipped in a dilute acid to neutralize the alkali component and thereby not allow the alkali component to remain in the film.

By the saponification treatment, the transparent support surface opposite the surface having an antireflection layer is hydrophilized. The protective film for polarizing plate is used by bonding the hydrophilized surface of the transparent support to the polarizing film.

The hydrophilized surface is effective for improving the adhesive property to the adhesive layer comprising polyvinyl alcohol as a main component.

In the saponification treatment, the contact angle with water on the transparent support surface opposite the surface having a low refractive index layer is preferably lower in view of adhesive property to the polarizing film, but, on the other hand, according to the dipping method, the surface having a low refractive index layer is also damaged by an alkali and therefore, it is important to select minimum necessary reaction conditions. As an index for the damage of antireflection layer by an alkali, particularly when the support is triacetyl cellulose, the contact angle with water of the transparent support surface on the side opposite the surface having an antireflection structure layer, that is, on the side to be laminated of the antireflection film, is preferably from 20 to 50°, more preferably from 30 to 50°, still more preferably from 40 to 50°. If the contact angle exceeds 50°, there arises a problem in the adhesive property to the polarizing film and this is not preferred, whereas if the contact angle is less than 20°, the antireflection film is too much damaged and the physical strength and light fastness are disadvantageously impaired.
(2) Alkali Solution Coating Method In order to avoid the damage of the antireflection film in the dipping method, an alkali solution coating method of coating an alkali solution only on the surface opposite the surface having an antireflection layer under appropriate conditions, and subjecting the film to heating, water washing and drying, is preferably used. In this case, the "coating" means to contact an alkali solution or the like only with the surface to be saponified. At this time, the saponification treatment is preferably performed such that the contact angle with water of the lamination surface of the antireflection film becomes from 10 to 50°. Other than the coating, this method includes spraying or contact with a belt or the like impregnated with the solution. When such a method is employed, equipment and step for coating the alkali solution are separately required and therefore, this method is inferior to the dipping method of (1) in view of the cost. However, since the alkali solution comes into contact only with the surface to be saponified, the film may have a layer using a material weak to an alkali solution on the opposite surface. For example, a vapor deposition film or sol-gel film is subject to various effects such as corrosion, dissolution and separation by an alkali solution and is not preferably provided in the case of dipping method, but in this coating method, such a film does not contact with the solution and therefore, can be used without problem.

The saponification methods (1) and (2) either can be performed after unrolling a roll-form support and forming respective layers and therefore, the treatment may be added after the production step of the antireflection film and performed in a series of operations. By continuously performing a step of laminating the film to a polarizing plate comprising a support which is unrolled similarly, a polarizing plate can be produced with higher efficiency than in the case of performing the same operations in the sheet-fed manner.

(Image Display)

The optical film of the present invention and the polarizing plate having the optical film can be used in various image displays such as liquid crystal display (LCD), plasma display panel (PDP), electroluminescent display (ELD), cathode ray tube display (CRT), field emission display (FED) and surface-conduction electron-emitter display (SED). For example, it is preferred that the image display comprises at least an image control part and an image display part (image display panel) and the low reflective layer is disposed to come to the viewing side. Also, when the optical film of the present invention is an antireflection film, a polarizing plate having the antireflection film may be used by bonding it to the glass of the liquid crystal cell of the liquid crystal display directly or through another layer.

EXAMPLES

The present invention is described in greater detail below by referring to Examples, but the present invention should not be construed as being limited thereto. Unless otherwise indicated, the "parts" and "%" are on the mass (weight) basis.
(Synthesis of Perfluoroolefin Copolymer (P1))

Into a 1 liter-volume separable flask equipped with an electromagnetic stirrer, a glass-made cooling tube and a thermometer, 50.0 g of a fluorine-containing polymer having a hydroxyl group (the fluorine-containing and silicone-containing heat-curable polymer described in Example 1 of JP-A-11-189621, number average molecular weight: 35,000), 0.01 g of 2,6-di-tert-butylmethylphenol as a polymerization inhibitor, and 370 g of methyl ethyl ketone (MEK) were charged and dissolved at 20° C. Subsequently, 3.0 g of 2-methacryloyloxyethyl isocyanate was added to the system and after stirring until the solution became uniform, 0.1 g of dibutyltin dilaurate was added to start the reaction. The stirring was continued for 5 hours while keeping the temperature of the system at 55 to 65° C., whereby an MEK solution of Perfluoroolefin Copolymer (P1) with about 30% of the hydroxyl group being methacrylated was obtained.

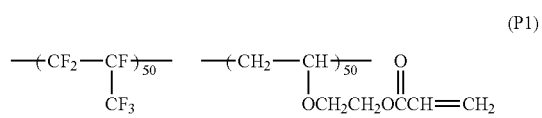

(P1)

(50:50 indicates a molar ratio)
(Preparation of Sol Solution a)

In a reaction vessel equipped with a stirrer and a reflux condenser, 120 parts by mass of methyl ethyl ketone, parts by mass of acryloyloxypropyltrimethoxysilane (KBM-5103, produced by Shin-Etsu Chemical Co., Ltd.) and 3 parts by mass of diisopropoxyaluminum ethyl acetate were added and mixed and after adding 30 parts by mass of ion-exchanged water, the reaction was allowed to proceed at 60° C. for 4 hours. The reaction solution was cooled to room temperature to obtain Sol Solution a. The mass average molecular weight was 1,600 and out of the oligomer or higher components, the proportion of the components having a molecular weight of 1,000 to 20,000 was 100%. Also, the gas chromatography analysis revealed that the raw material acryloyloxypropyltrimethoxysilane was not remaining at all.
(Preparation of Liquid Dispersion A)

Parts by mass of acryloyloxypropyltrimethoxysilane (produced by Shin-Etsu Chemical Co., Ltd.) and 1.5 parts by mass of diisopropoxyaluminum ethyl acetate were added and mixed to 500 parts by mass of a hollow silica fine particle sol (isopropyl alcohol silica sol, produced according to Preparation Example 4 of JP-A-2002-79616 by changing the size, average particle diameter: 60 nm, shell thickness: 10 nm, silica concentration: 20 mass %, refractive index of silica particle: 1.31) and after adding thereto 9 parts by mass of ion-exchanged water, the reaction was allowed to proceed at 60° C. for 8 hours. The reaction solution was then cooled to room temperature and 1.8 parts by mass of acetylacetone was added thereto. While adding methyl isobutyl ketone to the obtained liquid dispersion to keep constant the silica content, the solvent was displaced by reduced-pressure distillation at a pressure of 20 kPa. Finally, the solid content concentration was adjusted to 30 mass % with methyl isobutyl ketone, thereby obtaining Liquid Dispersion A. No foreign matter was generated in the liquid dispersion. The amount of residual isopropyl alcohol in Liquid Dispersion A obtained was analyzed by gas chromatography and found to be 1.5%.

Example 1

(Production of Antireflection Film)
(Preparation of Coating Solution HC-A for Hardcoat Layer)

36 Parts by mass of modified dipentaerythritol hexaacrylate (DPCA-120, produced by Nippon Kayaku Co., Ltd.) was dissolved in a mixed solvent containing 7.0 parts by mass of methyl ethyl ketone and 30.5 parts by mass of methyl isobutyl ketone and to the solution obtained, 1.5 parts by mass of a photopolymerization initiator (IRGACURE 907, produced by Ciba-Geigy Co.) was added, followed by stirring until the initiator was dissolved. Subsequently, 25 parts by mass of MIBK-ST (a methyl isobutyl ketone dispersion of $SiO_2$ having an average particle diameter of 10 to 20 nm and a solid content concentration of 30 mass %, produced by Nissan Chemicals Industries, Ltd.) was added thereto and stirred to obtain a mixture, and the mixture was filtered through a polypropylene-made filter (PPE-03) having a pore size of 3 µm to prepare Coating Solution HC-A for Hardcoat Layer.

(Preparation of Coating Solution MA for Medium Refractive Index Layer)

40 Parts by mass of a mixture of dipentaerythritol pentaacrylate and dipentaerythritol hexaacrylate (DPHA, produced by Nippon Kayaku Co., Ltd.) was added to 49.2 parts by mass of a commercially available zirconia-containing UV-curable hardcoat solution (DESOLITE Z7404, produced by JSR CORP., solid content concentration: about 61%, solvent: methyl isobutyl ketone, $ZrO_2$ content in solid content: about 70%, containing a polymerizable monomer and a polymerization initiator), and methyl isobutyl ketone (MiBK) and isopropanol (IPA) were added thereto to give a solid content concentration of 3.5 wt %, followed by stirring for 10 minutes. The ratio between MiBK and IPA was adjusted to be 1:1.5 (mass (weight) ratio). The mixed solution obtained above was filtered through a polypropylene-made filter (PPE-03) having a pore size of 3 µm to prepare Coating Solution MA for Medium Refractive Index Layer.

The refractive index of the layer formed of this coating solution was 1.60.

(Preparation of Coating Solution HA for High Refractive Index Layer)

Methyl isobutyl ketone (MiBK) and isopropanol (IPA) were added a commercially available zirconia-containing UV-curable hardcoat solution (DESOLITE Z7404, produced by JSR CORP., solid content concentration: about 61%, solvent: methyl isobutyl ketone, $ZrO_2$ content in solid content: about 70%, containing a polymerizable monomer and a polymerization initiator) to give a solid content concentration of 3.0%, and the resulting solution was stirred for 10 minutes. The ratio between MiBK and IPA was adjusted to be 1:2 (mass (weight) ratio).

The mixed solution obtained above was filtered through a polypropylene-made filter (PPE-03) having a pore size of 3 µm to prepare Coating Solution HA for High Refractive Index Layer.

The refractive index of the layer formed of this coating solution was 1.72.

(Preparation of Coating Solution LA for Low Refractive Index Layer)

283 Parts by mass of a thermal crosslinking fluorine-containing polymer (JTA113, solid content concentration: 6%, produced by JSR Corp.) containing polysiloxane and a hydroxyl group, 30 parts by mass of colloidal silica liquid dispersion MEK-ST-L (trade name, produced by Nissan Chemicals Industries, Ltd., average particle diameter: 45 nm, solid content concentration: 30%) and 10 parts by mass of Sol Solution a were mixed, the solvent was displaced with IPA under reduced-pressure distillation, and the solid content concentration was then adjusted to 2.2 mass % (weight %). After stirring, the obtained solution was filtered through a polypropylene-made filter having a pore size of 1 µm to prepare Coating Solution LA for Low Refractive Index Layer. The refractive index of the layer formed of this coating solution was 1.45.

(Production of Antireflection Film by Simultaneously Coating)

The antireflection film of Example 1 was produced by the following procedure. Using a composite coater having a slot die in one layer and a slide in three layers, Coating Solution HC-A for Hardcoat Layer, Coating Solution MA for Medium Refractive Index Layer, Coating Solution HA for High Refractive Index Layer and Coating Solution LA for Low Refractive Index Layer were coated on a 80 µm-thick triacetyl cellulose film (TAC-TD80U, produced by Fuji Photo Film Co., Ltd., refractive index: 1.48) to have a dry film thickness of 13 µm, 65 nm, 120 nm and 90 nm, respectively, by appropriately adjusting the wet coated amount while transporting the film in the form of a web at a speed of 30 m/min and then dried at 100° C. for 2 minutes. Thereafter, the coated layers were cured by irradiating 500 $mJ/cm^2$ of ultraviolet ray under the condition of the oxygen concentration being reduced to 0.05 vol % by nitrogen purging, and further heat-cured at 110° C. for 10 minutes, whereby an antireflection film was produced. For the irradiation of ultraviolet ray, a metal halide lamp having a linear output of 160 W/cm was used.

Comparative Example 1

The antireflection film of Comparative Example 1 was produced by the following procedure (corresponding to the method of sequentially forming layers). Coating Solution HC-A for Hardcoat Layer was coated on a 80 µm-thick triacetyl cellulose film (TAC-TD80U, produced by Fuji Photo Film Co., Ltd., refractive index: 1.47) by using a throttle die coater and dried at 100° C. for 2 minutes, and 70 $mJ/cm^2$ of ultraviolet ray was irradiated thereon under the condition of the oxygen concentration being reduced to 0.1 vol % by nitrogen purging to cure the coating layer, thereby forming a hardcoat layer (refractive index: 1.51, film thickness: 13 µm).

Subsequently, Coating Solution MA for Medium Refractive Index Layer was coated by using a throttle die coater and dried at 100° C., and 200 $mJ/cm^2$ of ultraviolet ray was irradiated thereon under the condition of the oxygen concentration being reduced to 0.1 vol % by nitrogen purging to cure the coating layer, thereby forming a medium refractive index layer (film thickness: 65 nm).

Thereafter, Coating Solution HA for High Refractive Index Layer was coated by using a throttle die coater and dried at 100° C., and 200 $mJ/cm^2$ of ultraviolet ray was irradiated thereon under the condition of the oxygen concentration being reduced to 0.1 vol % by nitrogen purging to cure the coating layer, thereby forming a high refractive index layer (film thickness: 120 nm).

Furthermore, Coating Solution LA for Low Refractive Index Layer was coated by using a throttle die coater and dried at 100° C., and the coating layer was cured by irradiating 500 $mJ/cm^2$ of ultraviolet ray thereon under the condition of the oxygen concentration being reduced to 0.05 vol % by nitrogen purging and further heating it at 110° C. for 10 minutes, thereby forming a low refractive index layer (refractive index: 1.45, film thickness: 90 nm).

Comparative Example 2

An antireflection film was produced by simultaneously coating in the same processing as in Example 1 except for using Coating Solution MB for Medium Refractive Index Layer, Coating Solution HB for High Refractive Index Layer and Coating Solution LB for Low Refractive Index Layer prepared by adding MEK in place of IPA used as the solvent in Coating Solution MA for Medium Refractive Index Layer, Coating Solution HA for High Refractive Index Layer and Coating Solution LA for Low Refractive Index Layer.

Examples 2 to 5 and Comparative Examples 3 and 4

Using the solute compositions of Coating Solution HC-A for Hardcoat Layer and Coating Solution LA for Low Refractive Index Layer, using each coating solution having the solvent species and solution concentration prepared with a main solvent, shown in Table 1, and using a composite coater having a slot die in one layer and a slide in one layer, Coating Solution HC-A for Hardcoat Layer and Coating Solution LA for Low Refractive Index Layer were coated to have a dry film thickness of 13 μm and 90 nm, respectively, by appropriately adjusting the wet coated amount while transporting the film in the form of a web at a speed of 30 m/min and then dried at 100° C. for 2 minutes. Thereafter, the coated layers were cured by irradiating 500 mJ/cm$^2$ of ultraviolet ray under the condition of the oxygen concentration being reduced to 0.05 vol % by nitrogen purging, and further heat-cured at 110° C. for 10 minutes, whereby an antireflection film was produced.
(Preparation of Coating Solution HC-C for Hardcoat Layer)

42 Parts by mass of modified dipentaerythritol hexaacrylate (DPCA-120, produced by Nippon Kayaku Co., Ltd.) was dissolved in a mixed solvent containing 7.0 parts by mass of MEK and 42 parts by mass of MiBK and to the solution obtained, 1.5 parts by mass of a photopolymerization initiator (IRGACURE 907, produced by Ciba-Geigy Co.) and 1.5 parts by mass of a photopolymerization initiator (IRGACURE 184, produced by Ciba-Geigy Co.) were added, followed by stirring until the initiators were dissolved. The resulting solution was filtered through a polypropylene-made filter (PPE-03) having a pore size of 3 μm to prepare Coating Solution HC-C for Hardcoat Layer.
(Preparation of Coating Solution LC for Low Refractive Index Layer)

62 Parts by mass in solid content of Perfluoroolefin Polymer (P1), 108 parts by mass of colloidal silica liquid dispersion MEK-ST-L (trade name, produced by Nissan Chemicals Industries, Ltd., average particle diameter: 45 nm, solid content concentration: 30%) and 14.5 parts by mass of Sol Solution a were mixed, and the solid content concentration was adjusted to 2.2 mass % with MEK. After stirring, the obtained solution was filtered through a polypropylene-made filter having a pore size of 1 μm to prepare Coating Solution LC for Low Refractive Index Layer. The refractive index of the layer formed of this coating solution was 1.43.
(Preparation of Coating Solution LD for Low Refractive Index Layer)

66 Parts by mass in solid content of Perfluoroolefin Polymer (P1), 96 parts by mass of hollow silica fine particle sol liquid dispersion (Liquid Dispersion A) and 14.5 parts by mass of Sol Solution a were dissolved in MEK, and the solid content concentration was adjusted to 2.2 mass %. After stirring, the obtained solution was filtered through a polypropylene-made filter having a pore size of 1 μm to prepare Coating Solution LD for Low Refractive Index Layer. The refractive index of the layer formed of this coating solution was 1.39.
(Preparation of Coating Solution LE for Low Refractive Index Layer)

A thermal crosslinking fluorine-containing polymer (the fluorine-containing and silicone-containing heat-curable polymer described in Example 1 of JP-A-11-189621, number average molecular weight: 35,000) (13.6 parts by mass), 3.40 parts by mass of a curing agent (CYMEL 303, trade name, produced by Nihon Cytec Industries Inc.) and 0.33 parts by mass of a curing catalyst (CATALYST 4050, trade name, produced by Nihon Cytec Industries Inc) were dissolved in 400 parts by mass of IPA. Furthermore, 30 parts by mass of colloidal silica liquid dispersion MEK-ST-L (trade name, produced by Nissan Chemicals Industries, Ltd., average particle diameter: 45 nm, solid content concentration: 30%) and 10 parts by mass of Sol Solution a were mixed thereto. Subsequently, the solvent was displaced with IPA under reduced-pressure distillation, and the solid content concentration was then adjusted to 2.2 mass %. After stirring, the obtained solution was filtered through a polypropylene-made filter having a pore size of 1 μm to prepare Coating Solution LE for Low Refractive Index Layer. The refractive index of the layer formed of this coating solution was 1.44.
(Preparation of Coating Solution LF for Low Refractive Index Layer)

10 Parts by mass (as solid content) of Perfluoroolefin Copolymer (P1) synthesized above was diluted with MEK and thereby adjusted to a concentration of 2.2 mass %. After stirring and dissolving, the obtained solution was filtered through a polypropylene-made filter having a pore size of 1 μm to prepare Coating Solution LF for Low Refractive Index Layer. The refractive index of the layer formed of this coating solution was 1.43.

Example 6

Coating Solution HC-C for Hardcoat Layer and Coating Solution LC for Low Refractive Index Layer were coated to have a dry film thickness of 11 μm and 90 nm, respectively, by appropriately adjusting the wet coated amount while transporting the film in the form of a web at a speed of 30 m/min and then dried at 100° C. for 2 minutes, and 500 mJ/cm$^2$ of ultraviolet ray was irradiated thereon under the condition of the oxygen concentration being reduced to 0.05 vol % by nitrogen purging to cure the coating layer, thereby producing a low-reflection film.

Example 7

A low-reflection film was produced in the same manner as in Example 6 except for changing Coating Solution LC for Low Refractive Index Layer to Coating Solution LD for Low Refractive Index Layer.

Example 8

Coating Solution HC-D for Hardcoat Layer was prepared in the same manner as in Coating Solution HC-C for Hardcoat Layer except that 4.23 parts by mass of light-transparent PMMA particle (MX-600, produced by Soken Kagaku K.K.) having a particle diameter of 6 μm were added. The addition of the light-transparent particle was performed by adding a 45 mass % MiBK liquid dispersion of the particle, and the solid content except for the light-transparent particle in Coating Solution was controlled to be 45 mass %.

An antiglare low-reflection film was produced by the same processing as in Example 6 except that Coating Solution HC-D for Hardcoat Layer was used in place of Coating Solution HC-C for Hardcoat Layer.
(Evaluation of Antireflection Film)

The obtained films were evaluated for the following items. The results obtained are shown together in Table 2.
(1) Reflectance The back surface of the film was roughened with sand paper and then color-treated with black ink to eliminate the back surface reflection and in this state, the specular reflectance and integrated reflectance were measured at 5° by a spectrophotometer V-550 (manufactured by JASCO Corp.).

(2) Coated Surface State

The back surface of the film cut into a length of 30 cm in the coating direction was roughened with sand paper and then color-treated with black ink to eliminate the back surface reflection and in this state, the surface state was observed with an eye. The superiority or inferiority of white-turbid scattering due to uneven interference color or reflectance or mixing of layers was evaluated according to the following criteria.

◎: Reflected light is optically uniform over the entire surface and appears as clear black in the directions other than regular reflection.

○: Reflected light has poor clearness and appears slightly white-turbid.

Δ: Reflected light appears white-turbid at first glance and appears uneven with different degrees in places.

X: Reflected light appears apparently white-turbid and light appears highly uneven also in the plane.

In Example 1, the integrated reflectance was 1.4% and good antireflection performance was revealed. Example 1 satisfies the relationship that the main component (DPCA-120) of the solute in the hardcoat layer as the first layer is sparingly soluble in the main component (IPA) of the solvent in the second layer provided thereabove, namely, the condition of the present invention. In Comparative Example 1, the integrated reflectance was 1.5% and good performance was revealed, but since respective layers were individually coated, there was provided a surface state that the color tint partially differs due to coating unevenness of each layer. In Comparative Example 2, white turbidity or strong color unevenness was generated over the entire surface, giving a surface state which can be hardly said to enable use as an optical film, and the reflectance was also immeasurable. Comparative Example 2 is in a relationship of the main component of solutes in each layer being soluble in the solvents of adjacent layers and it seems that vigorous interlayer mixing was brought about.

The results of low-reflection films having a two-layer constitution of Examples 2 to 7 and Comparative Examples 3 and 4 are shown in Table 1. In Examples 2 and 3, the film was constituted such that the monomer material as the solute of the lower layer was sparingly soluble in IPA as the solvent of the upper layer and at the same time, the fluorine polymer as the solute of the upper layer was easily soluble in MiBK as the solvent of the lower layer, that is, the relationships of the invention were satisfied, and good reflectance performance was obtained without causing interface mixing. In Comparative Example 3, the solute of the upper layer was insoluble in the solvent of the lower layer and therefore, the upper layer was not formed as a uniform layer, but thickness unevenness was generated in a sea-island pattern and the surface state was slightly white-tinted.

In Examples 2 and 4, a phase-separated state was obtained when the coating solutions of the upper and lower layers were mixed at a coated amount ratio (by volume) (that is, the relationship of the invention was satisfied), and in Examples 3, 5, 6 and 7, phase separation swiftly occurred when the coating solutions of the upper and lower layers were mixed at a coated amount ratio (by volume) and then the solvents were evaporated by drying (that is, the relationship of the invention was satisfied). In these Examples, the interface mixing was suppressed immediately after coating and a film having good reflectance performance was obtained. On the other hand, the film obtained in Comparative Example 4 came to have a white-turbid surface state and failed in reducing the reflectance performance. Furthermore, the optical film of the present invention had a hardcoat layer and therefore, was excellent also in the scratch resistance.

TABLE 2

| | | Example 2 | Example 3 | Example 4 | Example 5 | Example 6 | Example 7 | Comparative Example 3 | Comparative Example 4 |
|---|---|---|---|---|---|---|---|---|---|
| Upper layer | Solvent | IPA | IPA | MEK | MEK | MEK | MEK | MEK | MEK |
| | Solid Content Concentration | 2% | 2% | 2% | 2% | 2% | 2% | 2% | 1% |
| Lower layer | Solvent | MiBK | MiBK | MiBK | MiBK | MiBK | MiBK | Toluene | MiBK |
| | Solid Content Concentration | 45% | 30% | 45% | 30% | 45% | 45% | 30% | 25% |
| Solubility of lower layer solute in upper layer solvent | | sparingly soluble | sparingly soluble | easily soluble | easily soluble | easily soluble | easily soluble | easily soluble | easily soluble |
| Solubility of upper layer solute in lower layer solvent | | easily soluble | easily soluble | easily soluble | easily soluble | easily soluble | easily soluble | insoluble | easily soluble |
| State of mixed solution | Coated weight ratio | two-phase separation | one phase | two-phase separation | one phase | one phase | one phase | Lower layer solute precipitated. | one phase |
| | After 10% drying | | two-phase separation | | two-phase separation | two-phase separation | two-phase separation | | |
| Specular reflectance | | 2.1% | 2.1% | 2.1% | 2.2% | 2.0% | 1.8% | 2.5% | 3.8% |
| Integrated reflectance | | 2.4% | 2.5% | 2.4% | 2.5% | 2.3% | 1.7% | 3.4% | 4.2% |
| Coated surface state | | ◎ | ◎ | ◎ | ○ | ◎ | ◎ | Δ white-turbid | X white-turbid unevenness |

The evaluation result of Example 8 with respect to "Solubility of lower layer solute", "Solubility of upper layer solute" and "State of mixed solution" was the same as Example 6. The antiglare low-reflection film of Example 8 was evaluated in the same manner, as a result, the specular reflectance was 0.9% and the integrated reflectance was 1.4%, revealing good reflectance performance. Also, by virtue of the antiglare effect owing to the surface irregularities, reflection of a light source such as fluorescent lamp or surroundings became more unrecognizable and satisfactory performance as a display surface film was obtained.

Furthermore, the optical film of the present invention could be used in various displays as, for example, a polarizing plate used in liquid crystal displays of various modes, a surface protective plate comprising a combination of polarizing plate and λ/4 plate used in organic EL, a flat CRT or PDP surface protective plate applied to PET film, and an SED surface protective film.

Example 9

Using the solute compositions of Coating Solution HC-A for Hardcoat Layer and Coating Solution LE for Low Refractive Index Layer and using each coating solution of which solvent species and solution concentration adjusted with the main solvent are shown in Table 2, the coating solution for hardcoat layer and the coating solution for low refractive index layer were coated by a composite coater having a slot die in one layer and a slide in one layer to have a dry film thickness of 13 μm and 90 nm, respectively, by appropriately adjusting the wet coated amount while transporting the film in the form of a web at a speed of 30 m/min and then dried at 80° C. for 2 minutes and further at 100° C. for 2 minutes. Thereafter, the coated layers were cured by irradiating 500 mJ/cm$^2$ of ultraviolet ray under the condition of the oxygen concentration being reduced to 0.05 vol % by nitrogen purging, and further heat-cured at 110° C. for 10 minutes, whereby a low-reflection film was produced.

Example 10

Using the solute compositions of Coating Solution HC-A for Hardcoat Layer and Coating Solution LF for Low Refractive Index Layer and using each coating solution of which solvent species and solution concentration adjusted with the main solvent are shown in Table 3, the coating solution for hardcoat layer and the coating solution for low refractive index layer were coated by a composite coater having a slot die in one layer and a slide in one layer to have a dry film thickness of 13 μm and 90 nm, respectively, by appropriately adjusting the wet coated amount while transporting the film in the form of a web at a speed of 30 m/min and then dried at 80° C. for 2 minutes and further at 100° C. for 2 minutes. Thereafter, the coated layers were cured by irradiating 500 mJ/cm$^2$ of ultraviolet ray under the condition of the oxygen concentration being reduced to 0.05 vol % by nitrogen purging, whereby a low-reflection film was produced.

The results of evaluations performed in the same manner as in Examples above are shown in Table 3.

TABLE 3

| | | Example 9 | Example 10 |
|---|---|---|---|
| Upper layer | Solvent | IPA | MEK |
| | Solid Content Concentration (%) | 2.0 | 2.0 |
| Lower layer | Solvent | MiBK | MiBK |
| | Solid Content Concentration (%) | 45 | 45 |
| Solubility of lower layer solute in upper layer solvent | | sparingly soluble | easily soluble |
| Solubility of upper layer solute in lower layer solvent | | easily soluble | easily soluble |
| State of mixed solution | Coated weight ratio | two-phase separation | one phase |
| | After 10% drying | | two-phase separation |
| Specular reflectance (%) | | 2.1 | 2.0 |
| Integrated reflectance (%) | | 2.4 | 2.3 |
| Coated surface state | | ◎ | ◎ |

As seen from Table 3, according to the present invention, a low-reflection film with excellent surface state can be obtained by simultaneous coating.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2006-089030 filed Mar. 28 of 2006, the contents of which are incorporated herein by reference.

What is claimed is:

1. A method for producing an optical film, comprising:
   simultaneously coating two separate coating solutions over a transparent support, wherein the two coating solutions are a lower layer coating solution to be coated on a transparent support side and an upper layer coating solution to be coated on an outermost surface side, and the two coating solutions each contains a solvent and a solute; and
   drying the solvent in each of the two coating solutions to provide two optical layers,
   wherein
   the main component of the solute in the lower layer coating solution is insoluble or sparingly soluble in the main component of the solvent in the upper layer coating solution,
   the main component of the solute in the upper layer coating solution is easily soluble in the main component of the solvent in the lower layer coating solution,
   the main component of the solute in the lower layer coating solution is at least one of a bifunctional or greater functional polymerizable monomer and oligomer, and
   a ratio of a wet coated amount of the upper layer coating solution to a wet coated amount of the lower layer coating solution is from 1/1 to 1/50.

2. The method of claim 1, wherein the lower layer coating solution has a higher solid content concentration than that of the upper layer coating solution.

3. The method of claim 1, wherein the lower coating solution has a higher viscosity, a higher solid content concentration, and a higher surface tension than those of the upper layer coating solution.

4. The method of claim 1, wherein the solute of the lower layer coating solution has a molecular weight of from 800 to 100,000.

5. The method of claim 1, wherein the simultaneously coating of the two coating solutions are performed by at least one method selected from the group consisting of a curtain coating method, an extrusion coating method, and a slide coating method.

6. The method of claim 1, wherein the simultaneously coating of the two coating solutions is performed by coating the lower layer coating solution on a web including the transparent support with a slot die of a composite coater, the composite coater comprising the slot die and a slide coating head disposed in an end part of the slot die, and coating the upper layer coating solution on the coated lower layer coating solution with the slide coating head, wherein the web continuously runs while being supported by a backup roller.

7. The method of claim 1, wherein the upper layer coating solution comprises a heat-curable or ionizing radiation-curable fluorine-containing compound.

8. The method of claim 7, wherein the upper layer coating solution further comprises a silicone compound.

9. The method of claim 7, wherein the heat-curable or ionizing radiation-curable fluorine-containing compound has a silicone structural unit in a molecule thereof.

10. The method of claim 1, wherein the lower layer coating solution comprises light-transparent particles having an average particle diameter of 1.0 μm or more.

11. The method of claim 1, wherein a coating solution provide to a layer except for an outermost surface layer of the optical film comprises inorganic oxide fine particles having an average particle diameter of 100 nm or less and a refractive index of 1.9 or more.

12. The method of claim 1, further comprising curing a coating film by at least one of heat treatment and irradiation of ionizing radiation after the drying of the solvent in the solutions.

\* \* \* \* \*